United States Patent [19]

Sawyer

[11] Patent Number: 4,717,971
[45] Date of Patent: Jan. 5, 1988

[54] PARTITIONED EDITING METHOD FOR A COLLECTION OF VIDEO STILL PICTURES

[75] Inventor: Edward G. Sawyer, Rochester, N.Y.

[73] Assignee: Eastman Kodak Company, Rochester, N.Y.

[21] Appl. No.: 45,262

[22] Filed: Apr. 9, 1987

Related U.S. Application Data

[63] Continuation of Ser. No. 644,166, Aug. 24, 1984, abandoned.

[51] Int. Cl.$^4$ .................... G11B 27/02; H04N 5/781
[52] U.S. Cl. .................................. 358/342; 358/903; 358/311; 360/14.1; 360/69; 360/72.1; 360/98; 369/83; 369/34
[58] Field of Search ............... 358/342, 335, 906, 311, 358/903, 102; 360/69, 71, 72.1, 72.2, 92, 98, 133, 132, 12, 13, 14.1-14.3; 369/30, 32, 33, 34, 36, 37, 38, 83, 19, 24

[56] References Cited

U.S. PATENT DOCUMENTS

| | | | |
|---|---|---|---|
| 3,724,935 | 4/1972 | Batter | 352/38 |
| 3,748,381 | 7/1973 | Strobele et al. | 178/6.6 A |
| 4,000,510 | 12/1976 | Cheney | 360/33 |
| 4,075,669 | 2/1978 | Louzil et al. | 360/92 |
| 4,132,469 | 1/1979 | Harvey | 358/102 |
| 4,210,785 | 7/1980 | Huber et al. | 360/12 |
| 4,210,940 | 7/1980 | Prysby et al. | 360/33 |
| 4,224,644 | 9/1980 | Lewis | 360/72.2 |
| 4,338,644 | 7/1982 | Staar | 360/69 |
| 4,425,586 | 1/1984 | Miller | 358/903 |
| 4,498,107 | 2/1985 | Yoshimaru et al. | 358/903 |
| 4,527,262 | 7/1985 | Manto | 369/34 |
| 4,573,084 | 2/1986 | Iida | 369/30 |
| 4,644,425 | 2/1987 | Tamaki | 360/69 |
| 4,652,939 | 3/1987 | Baumeister | 360/133 |
| 4,654,727 | 3/1987 | Blum et al. | 360/71 |
| 4,660,101 | 4/1987 | Martin | 358/335 |
| 4,675,755 | 6/1987 | Baumeister et al. | 360/133 |

FOREIGN PATENT DOCUMENTS

| | | |
|---|---|---|
| 59-92474 | 5/1984 | Japan . |
| 1487507 | 10/1977 | United Kingdom . |
| 2064260 | 6/1981 | United Kingdom . |

OTHER PUBLICATIONS

SMPTE Journal, vol. 80, #8, Aug. '71, Flaherty et al., "New Television Production Techniques".
Fischer, "Condor, an Integrated Data Base Information Retrieval System . . . ", Siemens Forschungs, vol. 10, #3, 1981.
"Electronic Still Camera", Kihara et al, Journal of Applied Photographic Engineering, vol. 9, No. 5, 10/83.
"The Electronic Still Camera, A New Concept in Photography", Kihara et al, IEEE Trans. on Consumer Electronics, vol. CE-28, No. 3, 8/82.

Primary Examiner—Raymond F. Cardillo
Assistant Examiner—Robert A. Weinhardt
Attorney, Agent, or Firm—David M. Woods

[57] ABSTRACT

A method is provided for establishing an electronic picture file composed of pictures prerecorded on a plurality of video disks that are disposed in a multi-disk video player. The arrangement and content of the picture file is determined by an editing procedure that specifies a plurality of attributes, such as image category, picture order, time allotted for viewing each picture, text to accompany each picture, and the like. The task of specifying these attributes is made manageable by partitioning the editing procedure into several levels, each level standing alone and undertaken separately as a complete, but simplified, editing procedure that produces an edited picture file ready for viewing.

5 Claims, 16 Drawing Figures

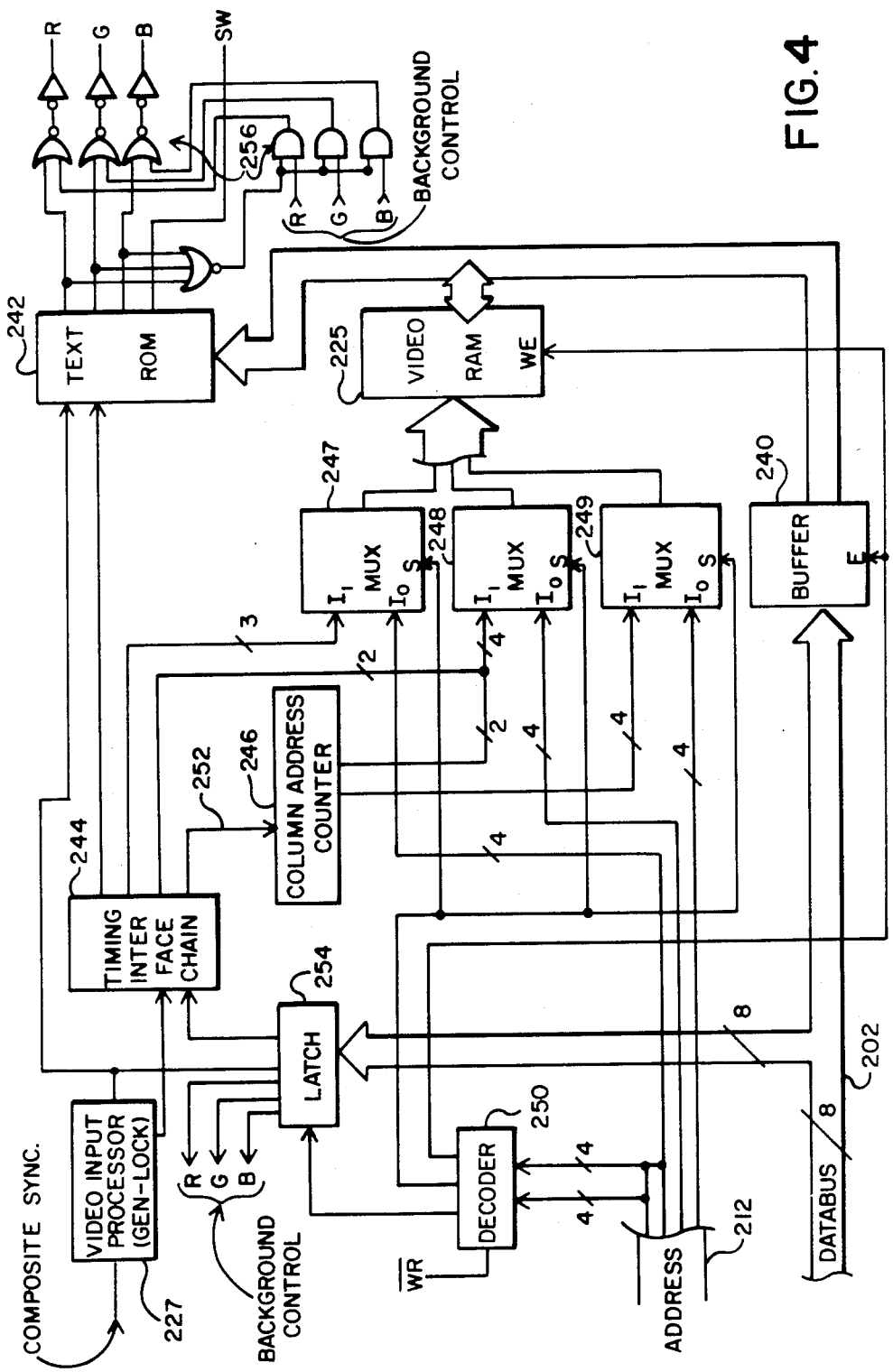

PARTITIONED EDITING METHOD FOR A COLLECTION OF VIDEO STILL PICTURES

This is a continuation of application Ser. No. 644,166, filed Aug. 24, 1984, now abandoned.

BACKGROUND OF THE INVENTION

1. Cross References to Related Applications

This patent application is related to (A) commonly assigned, copending patent application Ser. No. 644,096, now U.S. Pat. No. 4,675,755, entitled "Video Disk Apparatus Providing Organized Picture Playback" and (B) commonly assigned, copending patent application Ser. No. 644,097, now U.S. Pat. No. 4,652,939, entitled "Disk Container Supporting A Detachable Memory," both filed on even date herewith.

2. Field of the Invention

The invention pertains to a method for establishing an automatic display of a series of still pictures, and especially to a method for establishing the attributes—order of display, viewing time, picture title, and the like—of an automatic display of a series of still pictures prerecorded on a plurality of video disks.

Description Relative to the Prior Art

Video still imaging is a proposed form of imaging that offers the amateur photographer a convenient way of displaying a series of still pictures. A typical video still camera uses a small magnetic disk as its memory device (see "Electronic Still Camera" by Kihara, N. et. al. *Journal of Applied Photographic Engineering*, Vol. 9, No. 5, October 1983, 159–163). A companion player is envisioned which, when a recorded disk is inserted into it, converts the signals recorded on the disk into a television signal from which the display is generated. Each disk may store not only a number of still pictures but certain picture-related data representing display attributes such as the time allotted to viewing each picture, the order of viewing, titles and text. (Such picture-related data may be contained with each picture on the picture track or on one or more special tracks on the disk). Most video players will have a digital processing capability—usually in a microcomputer and its programs. The picture-related data is generated and stored by operation of the digital processor, usually after a number of pictures have been collected on the disk. In doing this, the pictures are edited one by one by specifying their display attributes, and the corresponding picture-related data is recorded on the disk. By processing the picture-related data from the disk, the player can subsequently provide customized, and automatic, viewing of pictures on that disk according to the specified display attributes.

Such picture collections are relatively small. A video disk contains, for example, twenty-five full-frame pictures or fifty single-field pictures on concentric tracks. The specification of the display attributes is relatively manageable for such small collections. However, video disks, being quite compact, lend themselves to organized storage in groups. Accordingly, it is desirable to display them in multi-disk groups. In the case of a typical multi-disk player, a container of, for example, thirty disks is inserted into the player (which is adapted to remove a selected disk and display its pictures). For a thirty-disk container, this means that the player can access as many as 1500 pictures. In addition, with so many pictures, it is desirable to separate the pictures into categories of like image content, that is, into picture albums, and group the several albums into a video picture file.

Editing such a large collection of pictures and organizing the pictures into a video picture file becomes unmanageable, particularly if each picture requires assignment of category and several display attributes. The task ordinarily requires a lot of effort and attention, and a good memory for detail, to correctly dispose of the pictures. However, the possible combinations of assignments and pictures is so large as to challenge even the capability of a professional. As a result, the system becomes overwhelming for one not interested in, or not capable of dealing with, a complex computer-driven editing operation.

SUMMARY OF THE INVENTION

The assignment of display attributes to a large group of pictures is reduced to a manageable task by partitioning the editing procedure into a plurality of levels, each level operating as a complete, but simplified, editing procedure that produces an edited result ready for viewing. Each editing level is undertaken separately with respect to a subset of the attributes but produces a result that may be combined with the result of another level, and so on with additional levels, to produce a progressively more complex organization for the picture file. Nonetheless, each level remains a self-contained entity capable of providing a completely operational picture file that is satisfying to view. A viewer that wants, or can only use, something simple will engage only one level while another viewer anxious to play with the computer-driven complexity of the system will utilize many levels.

A preferred embodiment of the invention pertains to an electronic picture file established according to an editing procedure that specifies the arrangement and content of the file display according to a set of attributes that may be applied to each picture in the file. According to the invention, the editing procedure is partitioned into a plurality of editing levels. Each editing level may be entered separately for organizing the picture file according to one or more attributes characteristic of that level. First, one of the editing levels is selected. Particular pictures are then selected for editing. A message is displayed which identifies the one or more attributes associated with the selected level. Indicia . . . that is, particular values for each attribute . . . are assigned to the attributes for the selected pictures. The assigned indicia are accumulated in a memory from which they may be recalled to display the selected pictures in the electronic picture file according to the attributes characteristic of the selected level.

BRIEF DESCRIPTION OF THE DRAWINGS

The invention will be described with reference to the figures, wherein:

FIG. 4 is a detailed schematic diagram of the video text generator shown as part of the circuit diagram in FIG. 3B;

DETAILED DESCRIPTION OF THE PREFERRED EMBODIMENT

Figure 1:
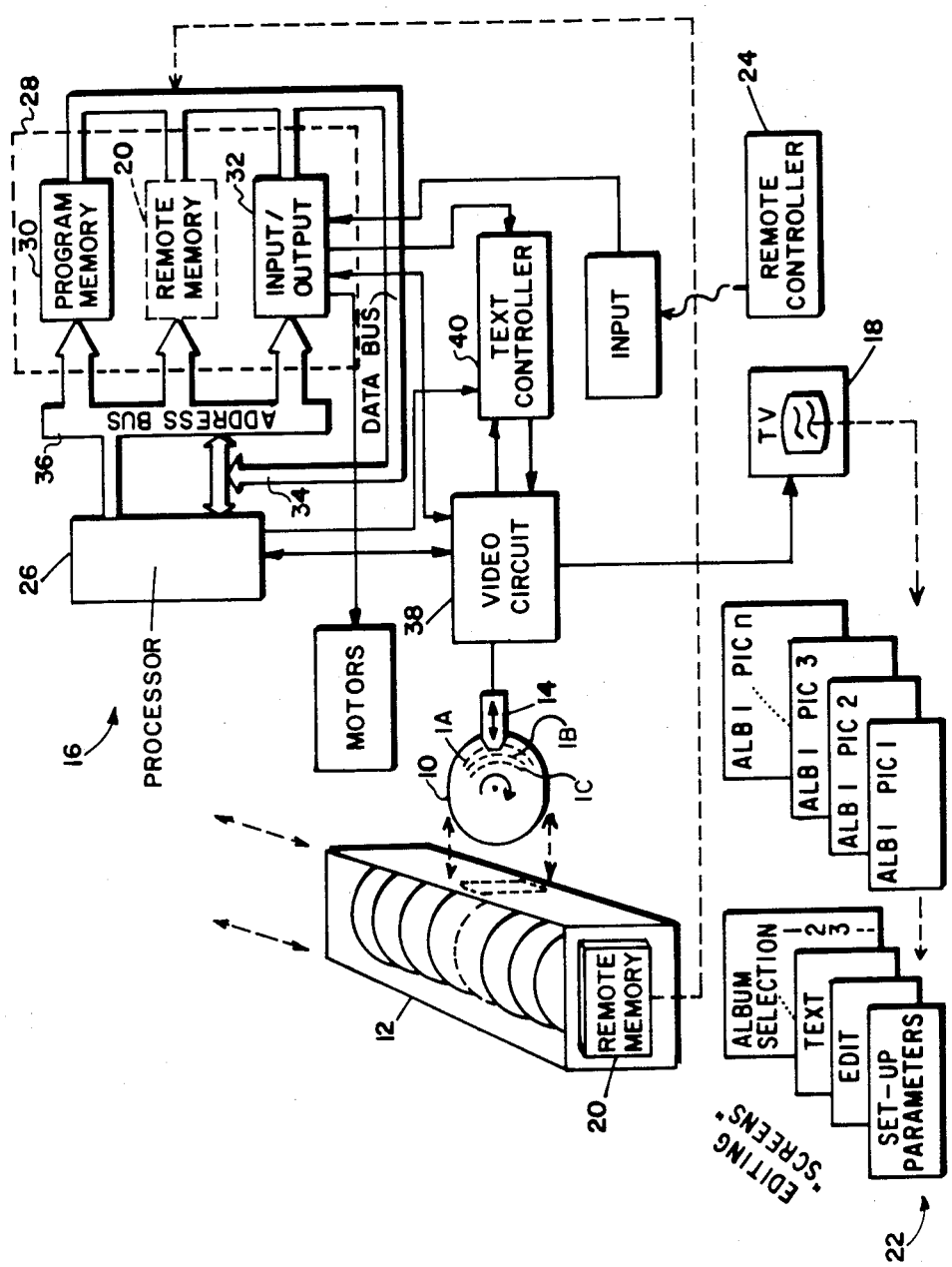
FIG. 1 is a schematic overview of video apparatus useful with a plurality of video disks having pictures arranged into a video picture file.

It is helpful to initially consider a schematic overview of a video disk player useful with a plurality of video disks organized into a video picture file. Such a player is shown by FIG. 1 and also described in detail in related patent application (A), Ser. No. 644,096 now U.S. Pat. No. 4,675,755. In FIG. 1, a video disk 10 has been automatically removed from a container 12 storing, say, thirty such disks. The disk may be optical or magnetic, rigid or floppy. The disk 10 has many concentric video tracks 1A, 1B, 1C . . . , each storing one picture. Fifty such tracks, and fifty pictures, are typically placed on the disk. A playback head 14 is seen adjacent one of these tracks. (Ordinarily the disk 10 will be contained in a protective cartridge, which is not shown here.) A player circuit 16, shown as a block diagram, reproduces each picture for display on a television 18 according to a particular arrangement prescribed by the display attributes of the video picture file.

Data necessary for establishing the video picture file is contained in a remote memory 20 appended to the container 12. The remote memory 20 may be a solid state device attached to the container 12 as a separate element as shown by FIG. 1. It may also be a magnetic stripe formed on the container 12 or a removable element, say one of the disks, taken from the container 12 when it is in the player. In related patent application (B), Ser. No 644,097 now U.S. Pat. No. 4,652,939, the remote memory 20 is shown as a detachable memory module containing one or more electrically-erasable programmable read-only memories (EEPROMs).

The remotely-stored data includes display attributes initially obtained by editing the pictures, that is, by assigning the pictures to one or more of, say, twenty albums or categories of like image content, by rearranging the viewing order (from the order on the disks), by skipping some pictures, by adding text to the assigned pictures, by setting individual viewing times, and so on. The viewer communicates with the player circuit 16 by observing editing "screens" 22 produced on the television 18, (which provide a guide to selections) . . . and then by entering a decision via an infra-red remote controller 24.

The video picture file data is stored in the remote memory 20 and remains there though the container 12 is removed from the player. To view an album, the container 12 is inserted into the player and the remote memory 20 is connected into the player circuit 16. An album is selected by observing album selection "screens" generated from the picture file data and pressing appropriate buttons on the controller 24. The pictures are then obtained in a rearranged order according to the particular album by accessing the disks, and the picture tracks on the disks, in a rearranged sequence—that is, a sequence unlike the order of disks, and tracks on the disks, as stored in the container 12. Viewing then proceeds automatically through the album according to the preselected display attributes with the viewer essentially unaware of the particular disks and tracks being accessed. The most the viewer does is to advance from one picture to the next by depressing an appropriate button on the remote controller 24.

The player circuit 16 includes a digital processor 26 that operates by means of programs and data stored in a memory array 28. The memory array 28 includes a set of read-only memories (ROMs) 30 for storing the operating programs and a word library for text generation. Read and write memories include the aforementioned remote memory 20 and input/output (I/O) space 32 for memory-mapped I/O, that is, an area of memory space dedicated to memory addresses that are actually used to address peripherals (such as motors and sensors). Each memory in the array 28 is connected to an address bus 36 and a data bus 34.

The processor 26 also interchanges data with a video circuit 38, which processes video and control data either read from or written on (i.e., applied to) the video disk 10. The processor 26 is also connected to a text controller 40, which generates the aforementioned "screens". The digital processor 26 operates the player by coordinating signals from a variety of input sensors, including the remote controller 24 and the head 14, with commands to a variety of output devices, including the motors (not shown) that move the container 12 in the player, remove the disk 10, position the head 14, and rotate the disk 10. The display to the television 18 is provided by switching the video circuit 38 line-by-line between a picture signal from the head 14 and a text signal from the text controller 40.

Figure 2:
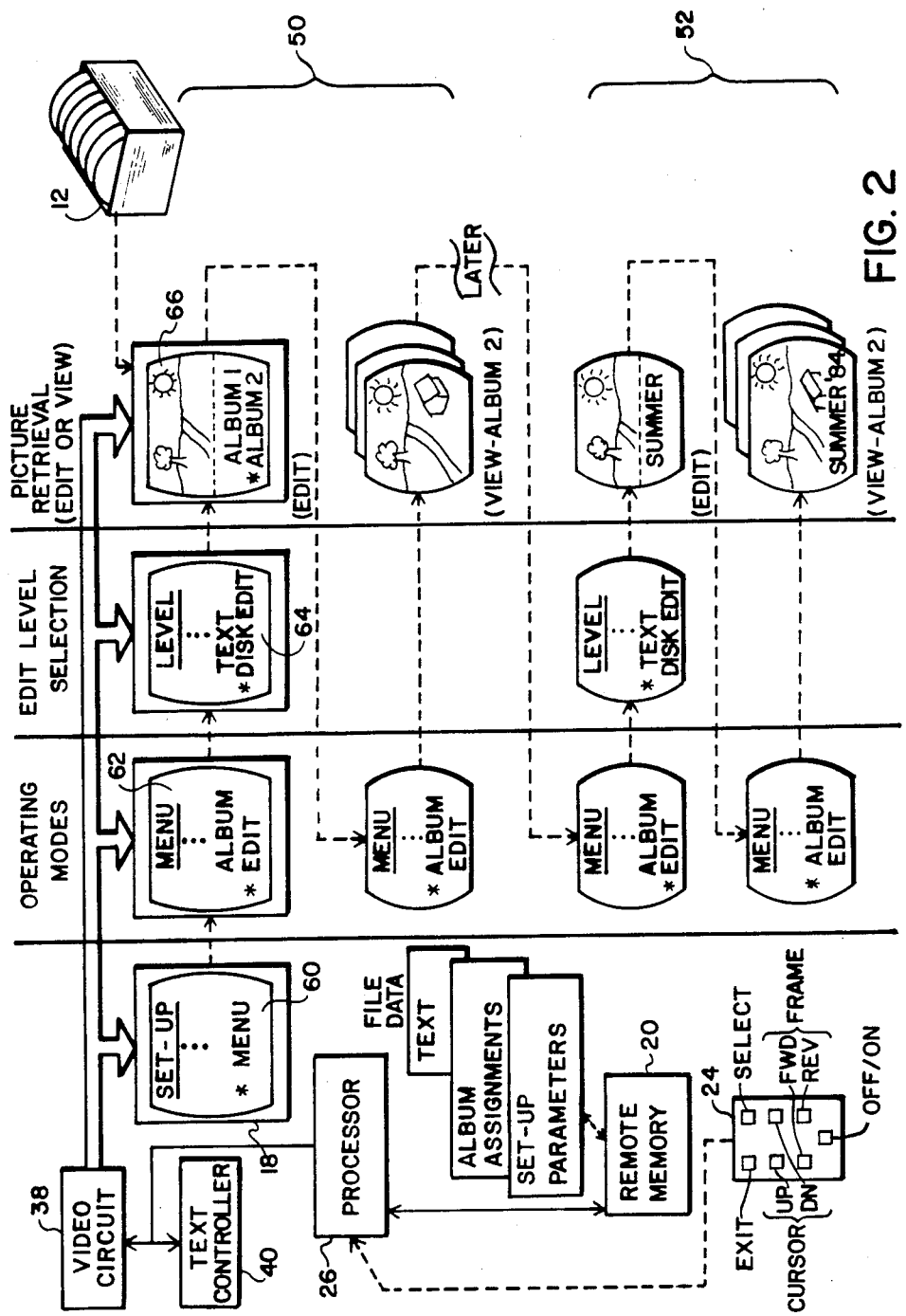
FIG. 2 is a schematic illustration helpful in describing an editing method according to the invention.

The organization of the pictures into a video picture file is reduced to a manageable task according to the invention by partitioning the editing procedure into several levels. It is helpful in understanding the invention to refer to FIG. 2, which shows a simplified two-stage partition of the editing procedure according to the invention. (Some aspects of the editing procedure, which will be described in detail later, have been omitted from FIG. 2 in order to simplify the illustration.) FIG. 2 includes certain elements (already described in connection with FIG. 1) which provide the video display necessary for editing—notably, the remote memory 20, the digital processor 26, the video circuit 38 and the text controller 40. The remote controller 24 is shown with the following control buttons:
Frame Forward
Frame Reverse
Cursor Up
Cursor Down
Select
Exit
On/Off Pressing a button on the controller 24 applies a corresponding infra-red signal to an input circuit (not shown) on the player, which senses and decodes the infra-red signal and conveys the decoded signal to the processor 26. Several buttons serve multiple functions depending on the condition of the player circuit 16. That is, pressing such a button means one thing at one time and another thing at another time. For example, the up/down buttons move a cursor (shown as an asterisk *) when the player circuit is involved in editing while, at other times, the same buttons move the container 12 forward or reverse in the player.

FIG. 2 shows the steps through which the viewer is taken in order to organize the pictures into a video picture file at either or both of first and second levels, depicted respectively by the reference characters 50 and 52. (Further levels will be described later). Editing is started by pressing the "on" button on the controller 24. This action causes a "set-up screen" 60 to show on the television monitor 18 (the television monitor 18 is repeated several times in FIG. 2 to depict the continuity of the editing process; nonetheless, only one television monitor is needed to show all the "screens" and practice this editing method). The "set-up screen" offers the viewer an opportunity to review and change certain display attributes (described in detail later) that apply for all the pictures. The "set-up screen38 also includes a particular selection—that of "menu"—which offers the viewer a direct path to the "menu screen" 62. To get there, the cursor is moved by use of the up/down buttons on the controller 24 until adjacent the "menu" message on the "set-up screen" 60. Then the select button is pushed and the "menu screen" 62 appears on the television 18. The "menu screen" 62 lists the operating modes of which the player is capable. Two are shown here: the "album" mode and the "edit" mode.

The cursor is moved adjacent the "edit" message (by the up/down buttons) on the "menu screen" 62 and the select button is pressed. Immediately, the various editing levels appear on an "edit option screen" 64 on the television 18. Two are shown here: the "text" level and the "disk edit" level. Categorizing the pictures into albums is done by virtue of the "disk edit" level; therefore the cursor is positioned adjacent the "disk edit" message on the "edit option screen" 64 . . . and then the select button is pressed. This action causes the processor 26 to retrieve the first picture from a selected disk in the container 12. (The particular disk is selected from an additional "screen", which will be described later.) The picture is reproduced along with a descriptive overlay showing the available albums (i.e., "composite screen" 66). The viewer inspects the picture and positions the cursor next to the album selection deemed appropriate for that picture. When the select button is pressed, the album assignment for the picture is entered into the remote memory 20. This procedure continues for each of the pictures.

After the last picture is assigned, or if the viewer wants to stop at any point, there are two ways out of the editing procedure. Pressing the off button turns the player off. Alternatively, the exit button may be pressed and the "menu screen" 62 will reappear on the television 18. Then the viewer may select another operating mode, such as the "album" mode shown on the "menu screen" 62. Selecting the "album" mode (by positioning the cursor and pressing the select button) automatically leads to mechanized viewing of the selected album. (An intervening step of selecting the particular album— from, say, among twenty—will be discussed later). Moving from picture to picture in the album is controlled by the forward/reverse buttons on the controller 24.

For many people, this is an entirely satisfactory point at which to conclude editing. Just having the pictures grouped by category is enough. For such people, the video picture file obtained by application of the first level 50, is a fully operational and entirely satisfactory result. For others, it is not—and for them, the second level 52 is provided. Its operation is largely identical to the first level except, of course, that the display attributes subject to editing are different. The second level 52 permits the addition of text to the pictures—titles, short descriptions, identifiers, dates, and the like. The second level 52 is reached by returning to the "menu screen" 62 (by pressing the exit button on the controller 24), calling up the "edit" mode of operation and then specifying the "text" level of editing when the various edit levels are shown on the "edit option screen" 64. (If the player had been turned off, then the "set-up screen" would be generated by pressing the "on" button). The resultant video picture file can be then viewed by going back to the "menu screen" 62.

It is important to note that the first and second levels of editing are independent, that is, the viewer could just as well have skipped the first level of editing (by category) and immediately gone to the second level (by text). Besides the flexibility of starting where one wants to, this course is appropriate for those special picture collections which need no categorization but only description. However, the ordinary progression is to first categorize the pictures by album and then, selecting a particular album, add text to selected pictures, and so on through further levels of editing (which will be described later).

Figure 3A:
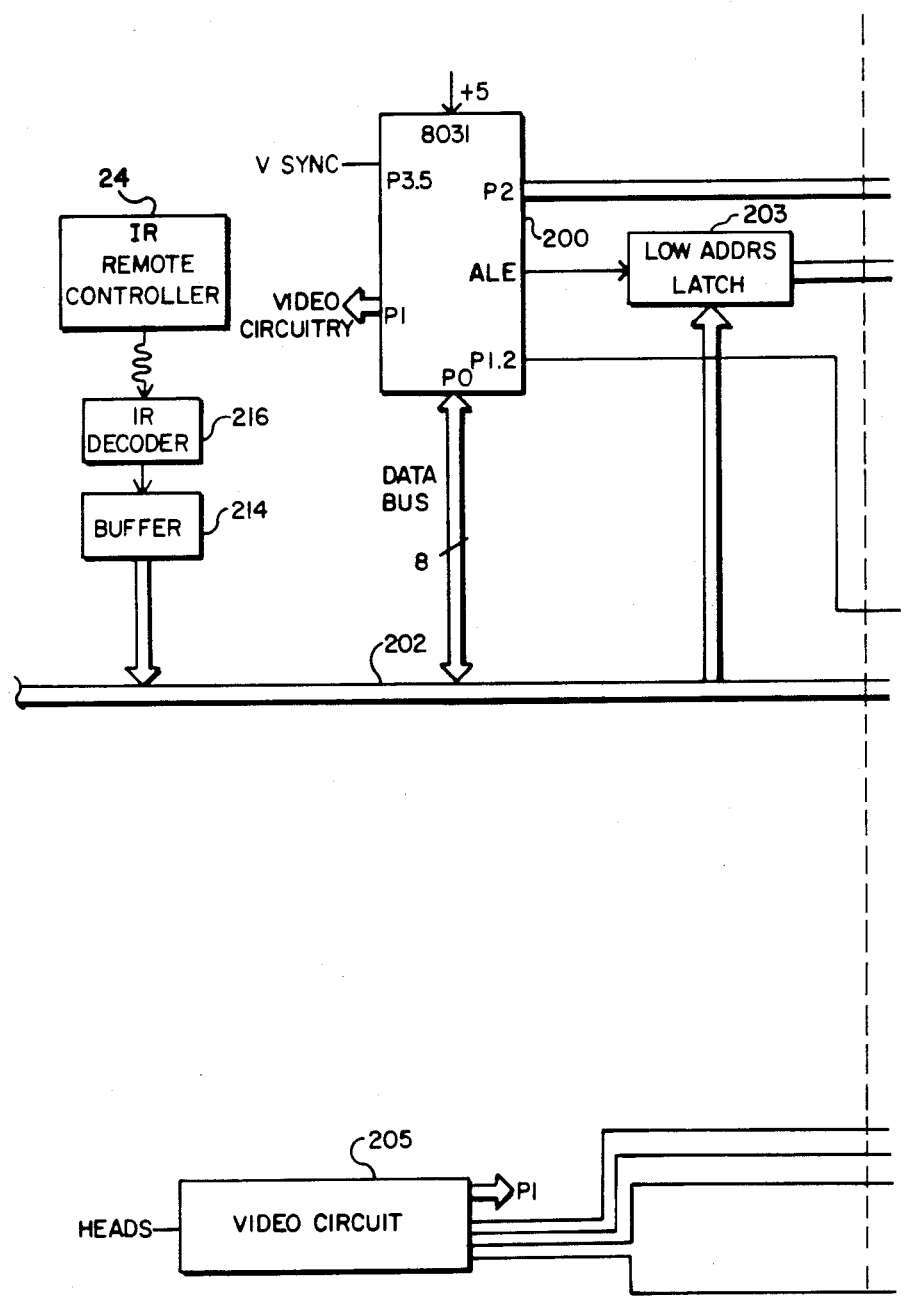
FIGS. 3A and 3B show a detailed circuit diagram for the player circuit shown by FIG. 1.
Figure 3B:
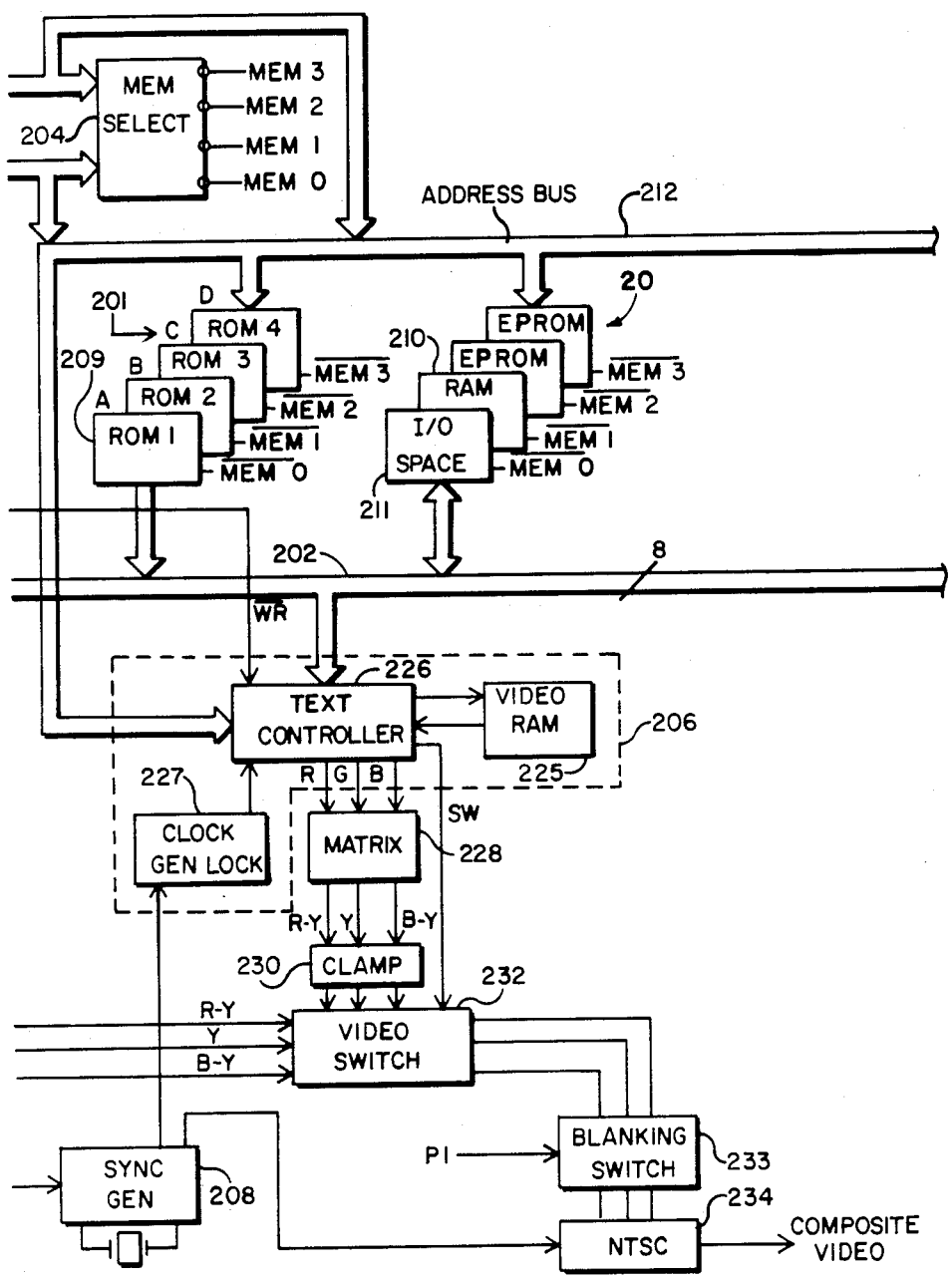

The player circuit 16 shown in FIG. 1 is further represented in detail by the circuit of FIGS. 3A and 3B. FIG. 4 provides further detail on certain features of the text generator shown in FIG. 3B. To aid in understanding certain parts of these Figures, some circuit elements are described as specific devices, including specific device nomenclature; however, other standard circuit devices may be readily substituted for such named devices.

The player circuit is organized around a microcomputer 200, such as the 8031 microcomputer manufactured by the Intel Corporation, and a memory array 201 including a pair of EEPROMs forming the memory devices in the remote memory 20. The 8031 microcomputer has 32 input/output (I/O) lines configured as four 8-bit parallel ports, labelled P0, P1, P2 and P3—and subdivisions thereof, e.g., P1.0 for the first line of the eight-bit port P1, P1.1 for the second line and so on. Port P0 connects to an 8-bit data bus 202 and provides for multiplexing both a low-order address byte and data onto the bus. The low-order address byte is latched off the data bus 202 and put on a 16-bit address bus 212 when a low address latch 203 is enabled by the address latch enable (ALE) line of the microcomputer 200. A high-order address byte is provided by the eight-line port P2 to the address bus 212 and a memory select decoder 204. One of the four outputs—MEM 0 to MEM 3—of the decoder 204 is driven low by the conditions of the address lines put into the decoder 204. The outputs MEM 0 to MEM 3 are applied to the chip enable input of respective memories within the memory array 201 and, when low, activate the respective memories for a read/write operation. The particular memory selected is a function of the output of the decoder 204 and the conditions of additional lines (not shown) from the microcomputer 200, i.e., the external data memory read and write strobe lines and the program store enable line.

The memory array 201 includes a set of read-only memories (ROMs) 209A ... 209D for storing the operating programs and a word library for text generation. Read and write memories include the aforementioned EEPROMs in the remote memory 20 (as disclosed in related patent application (B), Ser. No. 644,097 now U.S. Pat. No. 4,652,939), a random-access memory (RAM) 210 and input/output (I/O) space 211 for memory-mapped I/O. Each memory in the array 201 is connected to the address bus 212 and to the data bus 202. ROMs 209A to 209D and the RAM 210 have, for example, $2K \times 8$ or $4K \times 8$ capacities. Depending on the capacity needed for the remote memory 20, the EEPROMs may have capacities of $2K \times 8$ (for example, provided by a Xicor X2816A device) or $8K \times 8$ (for example, a Xicor X2864A device).

The eight-bit port P1 of the microcomputer 200 serves several purposes in the player circuit. Several lines are used to interchange data with a video circuit 205, which processes video and control data either read from or written to the magnetic disk 14. The video circuit 205 is conventional; since it is not crucial to a description of the editing method according to the invention, it will not be described in detail. One bit of the port P1—P1.2—applies a write (WR) pulse to a text generator 206. The fourth eight-bit port P3 serves various special functions which are characteristic of the 8031 microcomputer, including that of two 16-bit timer/counters incorporated within the microcomputer chip and the read and write strobe lines (mentioned earlier). Port P3.5 receives vertical synchronization pulses from a sync generator 208 connected to the video circuit 205.

Input data regarding the condition of the remote controller 24 is asserted onto the data bus by a buffer 214. The remote controller 24 emits infrared radiation that is modulated to indicate which button the viewer is depressing. The infrared signal is detected by an infrared decoder 216, which has a unique decoded output corresponding to each of the controller instructions. The decoded output line drives a corresponding input line of the buffer 214. The buffer 214 is enabled by lines (not shown) from the microcomputer 200 at the appropriate moment, at that time asserting its input states onto the data bus 202. (Other input signals regarding the condition of the player come from various sensors associated with parts of the player. Output signals for operating various motors are also latched off the data bus 202. These sensors and motors, and associated circuitry, are discussed in detail in related patent application (A), Ser. No. 644,096 now U.S. Pat. No. 4,675,755).

The text generator 206 comprises a video RAM 225, a text controller 226 and a clock-gen lock circuit 227. (A gen lock circuit is a conventional system of regenerating synchronizing pulses and a master clock from a composite video source.) The text generator 206 assembles, according to instructions from the microcomputer 200, text messages for display on the television 18 as the aforementioned "screens". The text controller 226 generates red, green and blue line scan (RGB) signals and a switching signal SW. The RGB signals are connected to a conventional matrix circuit 228, which generates two color-difference signals $R-Y$ and $B-Y$ and a luminance signal Y. The dc component of the color difference signals $R-Y$ and $B-Y$ and the luminance signal Y is restored by a clamp 230, which causes the black tips of the signals to be fixed at a predetermined level. The clamped signals—representative of text—are introduced to a video switch 232, which also receives picture signals from the video circuit 205. The switching signal SW from the text controller 226 determines which set of video signals the switch 232 will transmit, i.e., text video or picture video. The transmitted signals are put through a blanking switch 233 to an NTSC generator 234, which puts out a composite video signal in NTSC format suitable for application to, and viewing on, the television 18 (FIG. 1). The blanking switch 233, which is controlled via port P1 of the microcomputer 200, ensures a blank (black) screen when cartridges are changed.

FIG. 4 is a detailed illustration of the text generator 206 shown in FIG. 3B. The video RAM 225 has capacity for 24 lines of text, each line having 40 columns of characters. The text data is partially assembled into word segments in a word library stored in one or more of the ROMs 209A, B, C or D (FIG. 3B). The word segments are connected together to form a particular message by conventional text programming of the microcomputer 200. A stream of the assembled and connected word segments are passed through the data bus 202 to a buffer 240, which—when enabled—presents the stream of word segments to the video RAM 225. Address locations for writing these word segments into the video RAM 225 are generated by the text program and asserted onto the address bus 212. The text message stored in the video RAM 225 is read out to a conventional text ROM (TROM) 242, such as a Phillips SAA5055. The text ROM 242 generates the dot pattern necessary for displaying the message on a television screen. The row/column addresses for reading out the message from the video RAM 225 are generated by a timing interface chain 244, such as a Phillips SAA5025, and a column address counter 246.

Since two sets of addresses are provided to the video RAM 225, one for writing word segments in and another for reading them out in a line scan sequence, it is necessary to keep such addresses distinct and to switch them to the video RAM at the proper time. A set of multiplexers 247, 248 and 249 provide that function. Twelve address lines, in 4-bit groups, are brought from the address bus 212 to respective $I_0$ inputs of the multiplexers 247, 248 and 249. Eleven address lines, in 3 groups, are brought from the timing interface chain 244 and the column address counter 246 to the $I_1$ inputs of the respective multiplexers 247, 248 and 249. The proper time for switching between the $I_0$ and $I_1$ inputs is determined by a dual 1-of-4 decoder 250, which takes for its input two 4-bit wide inputs from the address bus 212. When set accordingly by the microcomputer 200, these two 4-bit inputs trigger the switch (S) inputs to the multiplexers 247, 248 and 249 and the enable (E) input to the buffer 240. At this time the write addresses from the address bus 212 are presented to the video RAM 225 and the stream of word segment data in the data bus 202 is written into corresponding storage locations. At other times, without the trigger pulse from the decoder 250, the read addresses from the timing interface chain 244 and the column address counter 246 are coupled through the multiplexers 247, 248 and 249 to the video RAM 225 and the stored word segment data is sent to the text ROM 242. The row address is set by five lines from the timing interface chain 244; at the same time a clock signal on the line 252 triggers the column address counter 246. The column addresses are then counted out for the 40 columns of a row by the column address counter 246 which, at the end of the line, is reset to start over on the next line, and so on through the 24 lines.

It is necessary to lock the text message to the timing of the picture video. This is done by the gen-lock circuit 227, which in FIG. 4 is shown to be a video input processor chip, such as a Phillips SAA5030. It is also desirable that the text generator 206 only control the video display during that part of the overall display time for which there is actual text. Ordinarily actual text may occupy only a small part of the available picture display; other parts of the display are devoted to, for example, display lines that separate lines of text. At these times, when no text is being shown, it is desirable to fill in the remaining display area with, say, an appealing color. This is done by latching a "no-text" color signal off the data bus when a latch 254 is clocked by a line from the decoder 250. This signal consists of "background" red, green and blue signals which are substituted for the R, G, B signals from the text ROM 242 during that part of the display time for which there is no text. The substitution is made by a configuration 256 of AND, NOR and inverting gates when the output lines of the text ROM 242 are simultaneously low (i.e., meaning no text signal is present).

The player circuit of FIGS. 3A and 3B controls the organization and use of the video picture file through operation of a video file operating system. This system steps the viewer through a prearranged sequence of operations. Several modes of operation are available, including the "set-up" mode, the "edit" mode, the "album viewing" mode and the "normal viewing" mode. Each mode interacts the viewer with the video file operating system. As discussed in connection with FIG. 2 such interaction is characterized by video messages put on the television 18 in the form of "screens". The description of the various "screens", when they are called up, and what the viewer does with them constitutes a list of requirements for the video file operating system, that is, a specification for the system. This specification is the basic document from which a computer program is written. A computer programmer of ordinary skill takes this specification and designs the appropriate program to fulfill the requirements set out therein. The statements used in the program will depend upon the approach taken by the individual programmer but the process is straight-forward and does not require experimentation in design.

The video file operating system first enters the "set-up" mode by displaying a "set-up screen" on the television. (The "set-up screen" and other screens were shown in abbreviated form as "screens" 60, 62, 64 and 66 in FIG. 2. Subsequent reference to "screens" will be to the fully specified versions about to be described). The "set-up screen" lists a choice of fundamental operating parameters that apply to all the pictures in the file, as follows:

| | | |
|---|---|---|
| SKIP FRAME | [ON/OFF] | (1) |
| PHOTO ID | [ON/OFF] | |
| TEXT | [ON/OFF] | |
| *PICTURE DATA | [ON/OFF] | |
| VIEW TIME | [ON/OFF] | |

-continued

| | |
|---|---|
| CONTINUE TO MENU | [ON/OFF] |

The existing condition of the parameters is that last set by the viewer and stored in the remote memory 20. It appears on the screen as either the word "ON" or the word "OFF". Should the user wish to change a parameter, the cursor is moved adjacent the parameter to be changed, and the select button on the remote controller 24 is pressed. (The cursor is moved in any "screen" by pressing the up/down buttons on the controller 24.) Pressing the select button will either enable or disable the parameter and change "OFF" to "ON", or vice versa, depending on its prior status. Each time a set-up parameter is changed, the new condition is stored in the remote memory 20.

When the "skip frame" parameter is ON, the video file operating system will bypass any picture previously edited to "skip frame". When "skip frame" is OFF, all pictures will be displayed in the order that they appear on the disk, or in the album. When the "photo ID" parameter is ON, the disk number and the frame number of the current picture appear on the television with the picture. When OFF, they will not appear. When the "picture data" parameter is ON, the video file operating system will examine the picture track of the picture currently on display; any data embedded within the picture track (on a buried sub-carrier, for example) will be displayed with the picture. Such data is ordinarily placed in the track when the picture is taken, and may include the date on which the picture was taken, taking conditions, and so on. When "picture data" is OFF, the data does not appear. When the "text" parameter is ON, text messages associated with particular pictures—like titles or descriptions—are displayed. These text messages are stored in the remote memory 20; unlike picture data, such text messages are written into the memory 20 by an editing operation after the picture is taken. When the "view time" parameter is ON, and the player is in an album viewing mode, the video file operating system automatically displays each picture for a time previously selected and then advances to the next picture in the album. However, the present viewing time may be overriden for a given picture by pressing the frame buttons on the controller 24. The last choice in the "set-up screen" is "continue to menu", which is an exit path that leads to the "menu screen" and enables the viewer to select a mode of operation.

The viewer sees the "menu screen" after exiting from the "set-up" screen. The "menu screen" lists the choices of operating modes, as follows:

| | |
|---|---|
| SET UP | (2) |
| *EDIT | |
| ALBUM VIEWING | |
| NORMAL VIEWING | |
| MAGAZINE TO UNLOAD POSITION | |

Each mode is selected by positioning the cursor and pressing the select button, just as before. The "set up" mode is the one just described; it may be desirable for the viewer to go back to it from time to time while interacting with the operating system. The "edit" mode permits the viewer to assign the pictures on the magnetic disks contained in the magazine to several albums and to specify the aforementioned display attributes.

The "album viewing" mode enables the viewer to select a particular album for viewing (of those already edited) while the "normal viewing" mode displays each picture without regard to album assignment. The last operating mode, that of "magazine to unload position", causes the magazine to cycle to its unload position so that it can be removed from the player. This mode is automatically entered when the OFF button is pressed on the remote controller 24. Pressing the exit button on the controller 24 at any time when the "menu screen" is not being displayed always returns the viewer to the "menu screen". Each of the first four modes will now be considered in detail.

The "edit" mode has separate levels of editing according to the invention. When the "edit" mode is selected from the "menu screen", an "edit option screen" is shown, listing five editing levels and an exit path, as follows:

| *DISK EDIT (3) |
| --- |
| PICTURE EDIT |
| ALBUM EDIT |
| TEXT EDIT |
| RENAME ALBUM |
| EXIT TO MENU |

Though the editing procedure could be designed so that any level of editing could be entered irrespective of previous levels, it is believed typical to expect a certain degree of progression. That is, the task of editing is better broken into levels as provided by the invention, but certain levels might be within a hierarchial editing sequence if that makes the task easier. As a result, the "disk edit", "picture edit" and "text edit" levels may be entered irrespective of previous editing but the "album edit" and "rename album" levels presume prior editing at the "disk edit" or "picture edit" levels.

When the "disk edit" level is selected, a "disk selection screen" appears on the television with the following message:

| *Pressing select will begin Viewing Disk [#] (4) |
| --- |
| exit |

The disk number [#] is increased or decreased by repeatedly pressing the cursor up or down buttons on the controller 24. When the desired disk number comes up, the select button is pressed and the "edit screen" appears on the television. This "screen" shows a cropped portion of the first picture of the selected disk and an album menu overlayed over the bottom of the picture, as follows:

| PICTURE | | | |
| --- | --- | --- | --- |
| AREA | | | |
| *ALBUM 1 | ALBUM 9 | ALBUM 17 | (5) |
| ALBUM 2 | ALBUM 10 | ALBUM 18 | |
| ALBUM 3 | ALBUM 11 | ALBUM 19 | |
| ALBUM 4 | ALBUM 12 | ALBUM 20 | |
| ALBUM 5 | ALBUM 13 | SKIP | |
| ALBUM 6 | ALBUM 14 | VIEW | |
| ALBUM 7 | ALBUM 15 | EXIT | |
| ALBUM 8 | ALBUM 16 | | |

The album menu at the bottom of the picture includes a list of twenty possible albums to which the picture may be assigned, as well as certain other possible actions such as "skip", "view" and "exit". The albums to which the picture is already assigned are shown in a different color. A picture is filed in an album (or deleted from an already assigned album) by moving the cursor to the selected album name and pressing the select button; then the selection is stored in the remote memory 20. After completing any additional album selections, and storing them in the remote memory 20, the disk is stepped to the next picture by use of the frame advance buttons. Pressing the select button while the cursor points to "skip" enters the picture into the "skip frame" category already discussed in connection with the "set-up screen" (screen (1)). The "skip frame" selection is also stored in the memory 20. Pressing the select button while the cursor points to "view" causes the album menu at the bottom part of the screen to be replaced with the remaining part of the picture so that the viewer can see the entire picture before deciding which album(s) to put it in. Pressing the select button while the cursor points to "exit" returns the "edit option screen" (screen (3)) to the television so that the viewer can select a different level of editing.

The "picture edit" level is used if the viewer wants only to look at pictures that have not been previously edited into an album. Pressing the select button while the cursor points to "picture edit" causes the "disk selection screen" (screen (4)) to appear on the television. After the desired disk number comes up on the screen, pressing the select button causes the first unedited picture on the selected disk to appear on the television. The picture is cropped with the album menu appearing at the bottom, as shown by the screen (5). The album selection process is identical to that of the "disk edit" level. Pressing the frame forward or reverse buttons will then increment the disk to the next unedited picture.

The "album edit" level is intended for use with pictures that have previously been edited into albums. At this level, the viewer indicates the order in which the pictures will be displayed, the order in which the disks are called, and a display time for each picture (the default order is chronological and the default time is 10 seconds). Pressing the select button when the cursor points to "album edit" causes the "album select screen" to appear on the television, as follows:

| AVAILABLE ALBUMS ARE | | |
| --- | --- | --- |
| *ALBUM 1 | ALBUM 11 | (6) |
| ALBUM 2 | ALBUM 12 | |
| ALBUM 3 | ALBUM 13 | |
| ALBUM 4 | ALBUM 14 | |
| ALBUM 5 | ALBUM 15 | |
| ALBUM 6 | ALBUM 16 | |
| ALBUM 7 | ALBUM 17 | |
| ALBUM 8 | ALBUM 18 | |
| ALBUM 9 | ALBUM 19 | |
| ALBUM 10 | ALBUM 20 | |
| | EXIT | |

The available albums are listed on the "album select screen" (6). Pressing the select button with the cursor pointing to a selected album brings up a separate message (7) inquiring as to whether picture order, disk order or view time is being determined.

| *PICTURE ORDER (7) |
| --- |
| DISK ORDER |
| VIEW TIME |
| EXIT |

Selecting view time causes each picture in the album to appear along with a numeric indication of the current view time. Pressing the cursor up or down buttons causes the numeric indication to cycle up or down through the available time selections. Pressing the frame advance or reverse button when the desired time is showing will enter the view time into the memory 20 and moves to the next or previous picture. Selecting picture order causes the picture numbers of the disk (i.e., those pictures in the selected album) to be displayed in the order in which they would appear in the album across the top of the screen (current order), as follows.

```
  1   3 4 5 6   8 9    11 12 13 14 15 16 17    19       (8)
                   *
      2 10 18 7
                *
```

A space is provided under the "current order" line for the "new order". The cursor is positioned along the "current order" line by using the cursor buttons. Pressing the select button when the cursor is underneath a particular picture number causes that picture number to enter the "new order" list in the next available spot. For example, screen (8) shows that "7" has just been moved to the "new order" list. In this way the current picture order is rearranged into a new picture order, which is stored in the memory 20. Selecting disk order causes a display similar to picture order except the identifying numbers of the disks assigned to the selected album, in the order in which the video file operating system will call them, are displayed instead of the picture numbers. The process of rearranging the order in which the disks are called up is the same as that for picture order rearrangement. The new order is also stored in the memory 20.

By means of the "text edit" level (of the "edit" mode) one line of text may be assigned to each picture and entered into the memory 20. When the select button is pressed while the cursor points to "text edit" (on the "edit option screen" (3)) the "disk selection screen" (4) is shown on the television. A disk is selected (in the same manner as done at the "disk edit" level) and the frame forward or reverse buttons are used to cycle to the picture to which text will be added. Pressing the select button again causes an alpha-numeric display in two parts to appear on the television:

```
ABCDEFGHIJKLMNOPQRSTUVWXYZ 0123456789         (9)
*
                    ENTER
                    EXIT
          THE NEW TEXT WILL APPEAR HERE
                                          *
```

The upper part lists a set of alpha-numeric characters. The lower part either shows the existing one-line text assigned to this picture or, if no text has yet been assigned, displays a prompting message. Each part has its own cursor, which are moved in sequence by the cursor up or down buttons. To start, the cursor on the upper part is moved to a desired alpha-numeric character. Pressing the select button then enables the lower cursor, which is moved to the position desired for the selected character (the upper cursor is still pointing to the selected character). When the lower cursor is in place, pressing the select button enters the new character into the text and into the remote memory 20 deleting any character that may have been there previously, and returns control to the upper cursor for the next new character. In this way an intelligible one-line description is assembled from the set of alpha-numeric characters in the upper part of the screen.

The "rename album" level (of the "edit" mode) permits the viewer to select or change the name of one of the twenty albums in the video file operating system. Pressing the select button with the cursor pointing to "rename album" on the "edit option screen" (3) causes the "rename screen" to be displayed on the television:

```
       OLD TITLE OOOOOOOOOOOOOOOO                (10)
       NEW TITLE NNNNNNNNNNNNNNNN
ABCDEFGHIJKLMNOPQRSTUVWXYZ 0123456789
*
```

The "rename screen" (10) is in three parts: an old title part, a new title part and a third part listing a set of alpha-numeric characters. Pressing the cursor up or down buttons cycles the old title part up or down through all twenty albums. (In the absence of a title, the old title shows as "album 1, album 2, album 3, . . . album 20".) Once an old album title is selected, pressing the select button enables a cursor adjacent the alpha-numeric third part, and a title is then assembled in the same manner as text was assembled in the "text edit" level. The album titles are entered into the memory 20 from which they are retrieved for the next showing of the album identifying screens (5) and (6).

Returning now to a discussion of the other operating modes listed on the "menu screen" (2), selection of the "album viewing" mode (by pressing the select button when the cursor points to that mode on the "menu screen") causes a list of all previously edited album titles to appear on the television, i.e., the "album select screen" (6). The viewer moves the cursor opposite a selected album and accesses that album by pressing the select button. Then the first picture in that album appears on the television, regardless of which disk it is on. If the "view time" parameter (from the "set-up screen" (1)) is ON, this picture—and each following picture—will be displayed for the time determined during the "album edit" level of the "edit" mode. If no time was determined the display time defaults to 10 seconds. If the "view time" parameter is OFF the pictures will be continuously displayed until either the frame forward or reverse buttons are pressed. Pressing these buttons advance or decrement the disk to the next or preceding picture in the album. Having the photo ID, text, or picture data parameters ON (from the "set-up screen" (1)) causes the corresponding text or data to appear along with the picture. Whether the picture advance is done automatically or manually from the remote controller 24, the disk and cartridge location of the picture is transparent to the viewer, that is, the viewer need not know and will not know the order of playback (unless the "photo ID" parameter is ON). The effort expended to generate this picture order was done at the "album edit" level of the "edit" mode; it need not be repeated at this time. The pictures included in the album were selected during the "disk edit" and/or "picture edit" levels of the "edit" mode; that work too is done. All the viewer, and anyone else watching, need do is to sit back and enjoy the show.

There are times when it is desirable to bypass the "album viewing" mode but still retain some of the automatic features of the video picture file. The "normal viewing" mode is provided for that reason. When this mode is selected (by pressing the select button when the cursor is pointing to that mode on the "menu screen" (2)), the "disk selection screen" (4) is displayed and the viewer selects a disk number (refer back to the "disk edit" level for the procedure for doing this). The video file operating system brings the first picture of the selected disk up on the television, displaying also the disk number and the picture number. Pressing the frame forward or reverse buttons advances or decrements the picture display within a given disk.

Modifying the existing order of the video picture file is an easy matter. Say for example a new disk is put into the magazine with pictures that relate to the existing albums in the video picture file. The viewer first sees the "set-up screen" (1) as a reminder of existing operating parameters and an opportunity to change them. Then the viewer goes to the "menu screen" (2) and points the cursor to the "edit" mode. Pressing the select button on the controller 24 brings up the "edit option screen" (3). The cursor is pointed to the "disk edit" level. Pressing the select button brings up the "disk selection screen" (4). The number of the new disk is entered and select is again pressed. The "edit screen" (5) appears, showing both the first picture (cropped) of the new disk and the list of albums in the video picture file (the names of albums will appear if they have been previously entered). Moving the cursor to the desired album and pressing the select button enters the new picture's album assignment into the memory 20 and brings up the next picture, and so on until all pictures in the new disk are examined. The viewer may stop at this point. However, the picture order may be rearranged by going to the "album edit" level and text can be added at the "text edit" level.

The preceding description relative to the "screens"—and especially how the viewer interacts with them—forms the basis for programming the video file operating system. A programmer of ordinary skill can take this description and, in due course but without undue experimentation, produce the necessary program. In the past, the programmer would devise a set of charts (i.e., flow charts) showing the flow of control through the system as an aid in the step of programming. More recently, a different type of chart showing the flow of data through the system has replaced the traditional flow chart as an aid in designing the program. Whichever programming aid is used, their generation (from the specification) and use is within the capability of the ordinarily skilled programmer. The latter charts are called data flow diagrams; their design and use is part of what is referred to as structured systems design and is thoroughly discussed in such references as *Structured Analysis and System Specification* by Tom DeMarco, New York, N.Y.: Yourdon, Inc., 1978, and *The Practical Guide to Structured Systems Design* by Meilir Page-Jones, New York, N.Y.: Yourdon Press, Inc., 1980. While unnecessary for the ordinarily skilled practitioner of structured systems design, the general reader may benefit from a showing of some typical data flow diagrams for the video file operating system. For that reason the operating system for the player circuit is shown in part by FIGS. 5-15 in terms of a nested set of data flow diagrams.

Data flow diagrams present a network representation of a system from the point of view of the data, rather than the point of view of that which acts upon the data (i.e., as would be presented by a flow chart). Certain conventions are used in a data flow diagram, as follows: A "bubble" is used to portray a process, that is, a place where data is transformed. Named lines (called named vectors) enter and leave the "bubbles". The vectors portray a data path or flow and the names, which are defined in a data dictionary, represent the pieces of data flowing along the data paths. Two parallel lines portray a file or data base; its name is between the lines. Data flow diagrams can partition a system into levels (thus the name, leveled data flow diagrams or top-down analysis). The top level is composed of a context data flow diagram delineating the domain of the system. Each "bubble" in the context diagram is expanded into a child diagram, each "bubble" in the child diagram into a further child diagram and so on until a child level of unpartitioned "bubbles"—called functional primitives—is reached. The basic rule of construction is that every data flow entering and leaving the perimeter of a given child diagram must be represented in its parent diagram. Using the data flow diagrams, the data dictionary and the rules and objectives spelled out in the specification, it is a straight-forward matter to write the statements of the program executed by each "bubble". This may be done directly in the chosen programming language or by means of well-known intermediate steps such as structured English.

Figure 5:
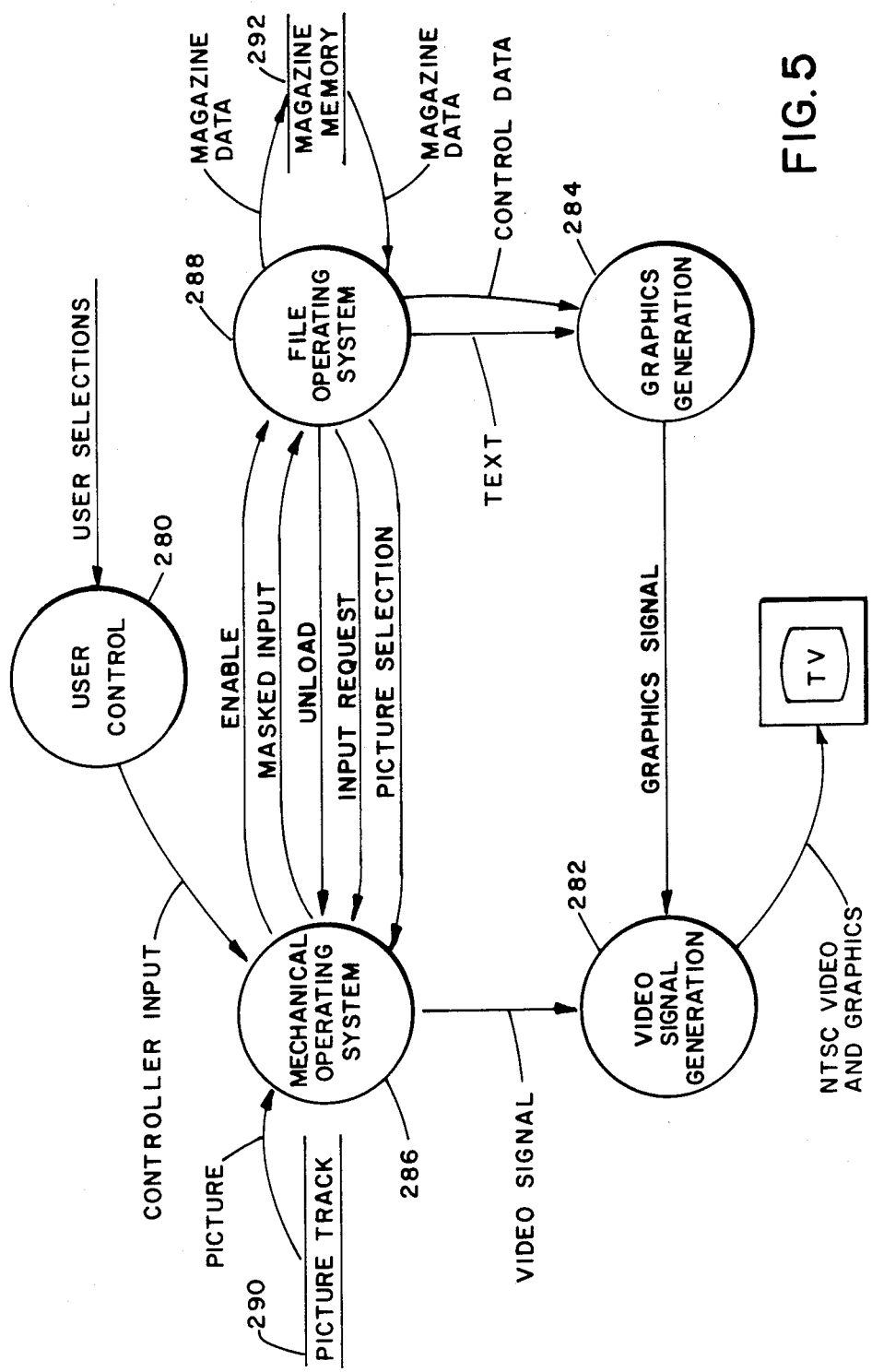
FIG. 5 is the overall data flow diagram for the circuit diagram of FIGS. 3A and 3B.
Figure 6:
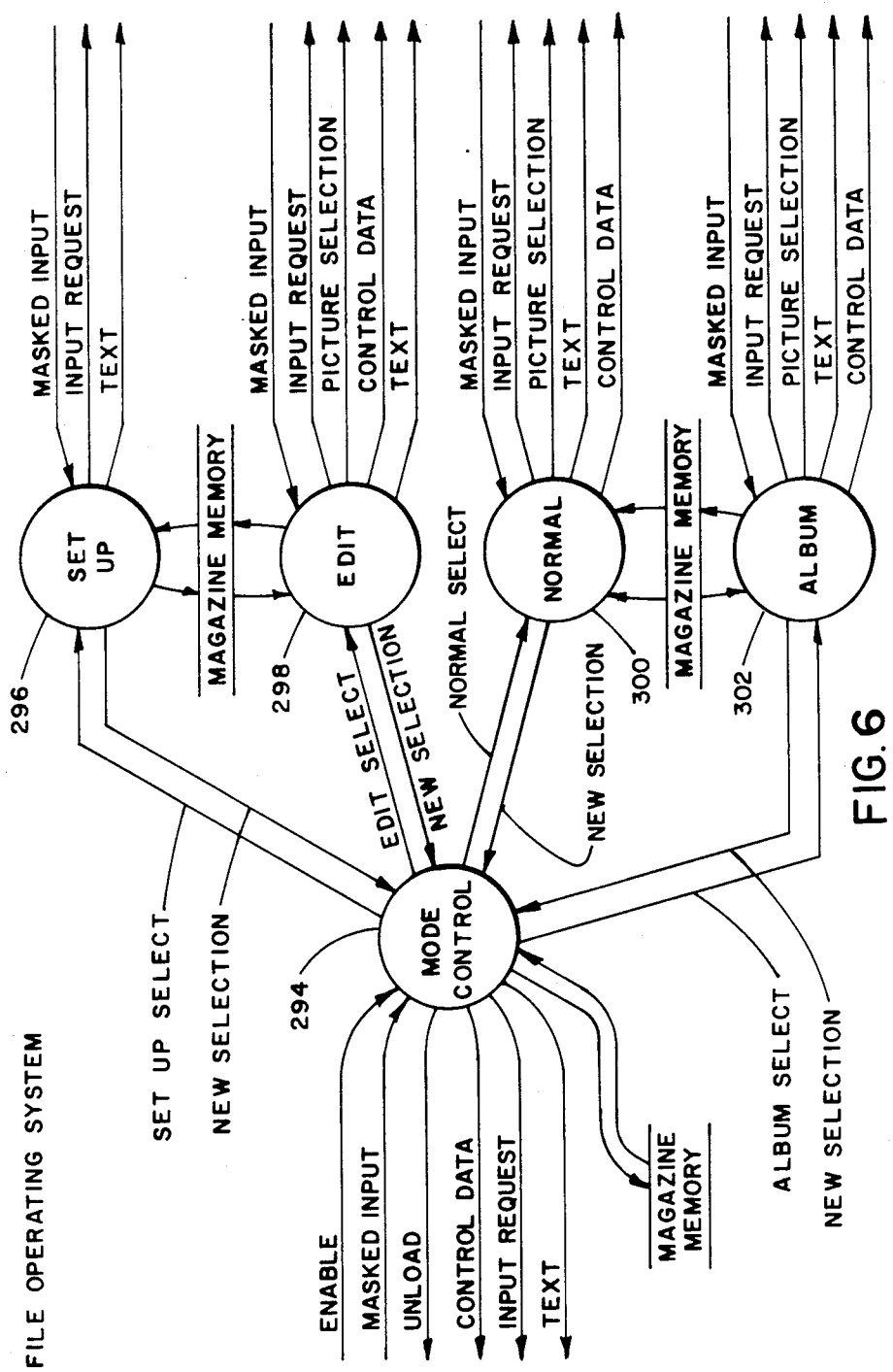
FIG. 6 is a data flow diagram of the file operating system of FIG. 5.

In terms of the above conventions, FIG. 5 is a context data flow diagram of the overall operating system for the video picture file portion of the video disk player. FIG. 6 is a level 1 child diagram expanding upon the file operating system "bubble" in FIG. 5 and showing the four modes of operation, that is, the "set-up", "edit", "normal" and "album" modes. FIGS. 7 through 10 are level 2 child diagrams expanding upon each of the four modes show in FIG. 6. FIGS. 11-15 are level 3 child diagrams expanding upon the separate editing levels shown by FIG. 8. Table I (at the end of this specification) shows the data dictionary for the data names associated with the named vectors of FIGS. 5-15.

The data flow diagrams of FIGS. 5-15, in combination with the data dictionary listed in Table I, are self-explanatory to a programmer of ordinary skill in structured systems design. However, again for the general reader, some comments are helpful. Some of the process "bubbles" relate to circuit elements shown in FIGS. 3A and 3B. In the context diagram of FIG. 5, a user control process 280 includes operation of the remote controller 24, a video signal generation process 282 includes operation of the video circuit 205 and a graphics generation process 284 includes operation of the text generator 206. The mechanical operating system 286 and the file operating system 288 include operating programs stored in the memory 201 and executed under direction of the microcomputer 200. The picture track 290 and the magazine memory 292 correspond directly to operations involving the video tracks on the disk 10 and the remote memory 20 (FIG. 1), respectively. (In the following description, data names will be printed in capital letters and refer directly to like names in the data flow diagrams and the data dictionary.)

With regard to FIG. 5, USER SELECTIONS are received from the user control 280 via CONTROLLER INPUT to the mechanical operating system 286. The file operating system 288 requests the current status of CONTROLLER INPUT via an INPUT REQUEST to the mechanical operating system 286. The CONTROLLER INPUT is an 8-bit word indicating, by which bit is set, which button on the remote controller 24 is active (i.e., has been pressed). However, recalling the discussion of the "screens", not all buttons are active for a given screen. Therefore, the file operating system 288, which controls the "screen" being displayed, masks the INPUT REQUEST. In other words, though INPUT REQUEST accommodates all 8 bits of CONTROLLER INPUT, it is responsive to a selected subset of bits depending on the "screen" in use. The response back to the file operating system 288 is MASKED INPUTS, indicating which bit passed by the mask is active. If a passed bit is active, the file operating system 288 performs whatever function corresponds to the button that was depressed.

The "menu screen (2)" is produced by a mode control process 294 shown in the level 2 diagram of FIG. 6. The mode control process 294 triggers the four file operating modes previously described by appropriate SELECT signals, specifically by providing SET-UP SELECT to the set-up process 296, EDIT SELECT to the edit process 298, NORMAL SELECT to the normal process 300 and ALBUM SELECT to the album process 302. Control is returned to the mode selection process 294 by NEW SELECTION, which is generated by pressing select when the user is pointing to "exit to menu " in any of the "edit" mode "screens" or by pressing the exit button. FIGS. 7-10 show exemplary sublevel data flow diagrams for the the set-up process 296, the edit process 298, the normal process 300, and the album process 302, respectively.

Figure 7:
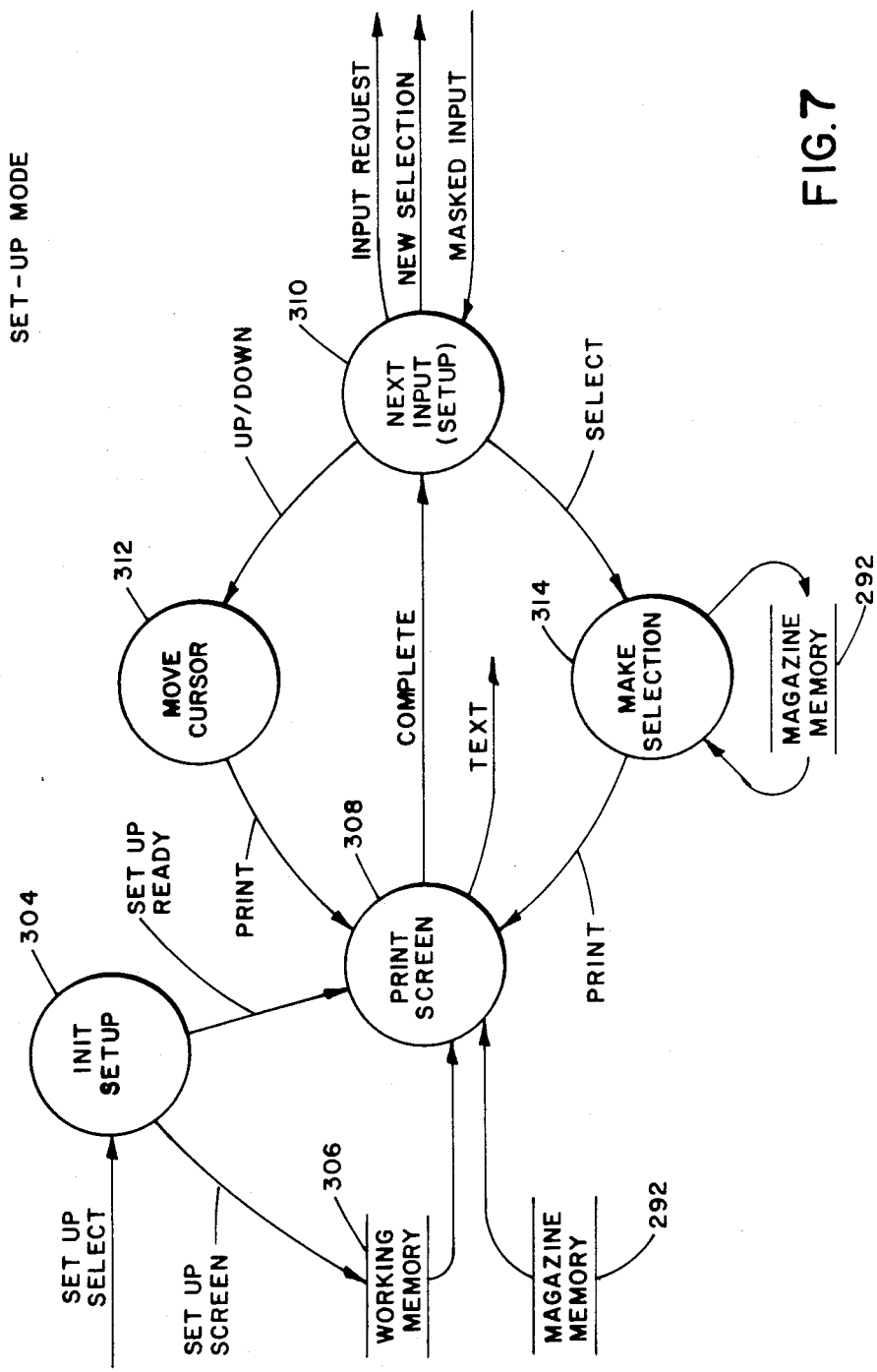
FIG. 7 is a data flow diagram of the set-up mode of FIG. 6.

In the set-up process diagrammed by FIG. 7, an initialization process 304 starts the set-up process. SET-UP SCREEN initializes the text signals associated with the "set-up screen", which are stored in a working memory 306 (such as the RAM 210 in FIG. 3B). SET-UP READY causes the screen to print (print screen process 308), drawing upon previous conditions stored in the magazine memory 292. COMPLETE triggers the next input process 310, where the system waits for the next MASKED INPUT. The input will to be to move the cursor (process 312) by UP/DOWN or to make a selection (process 314) by SELECT. When a selection is made, it is stored in the magazine (remote) memory 292 in place of the previous selection. The user gets out of this loop by NEW SELECTION, which leads back to the menu screen (2).

Figure 8:
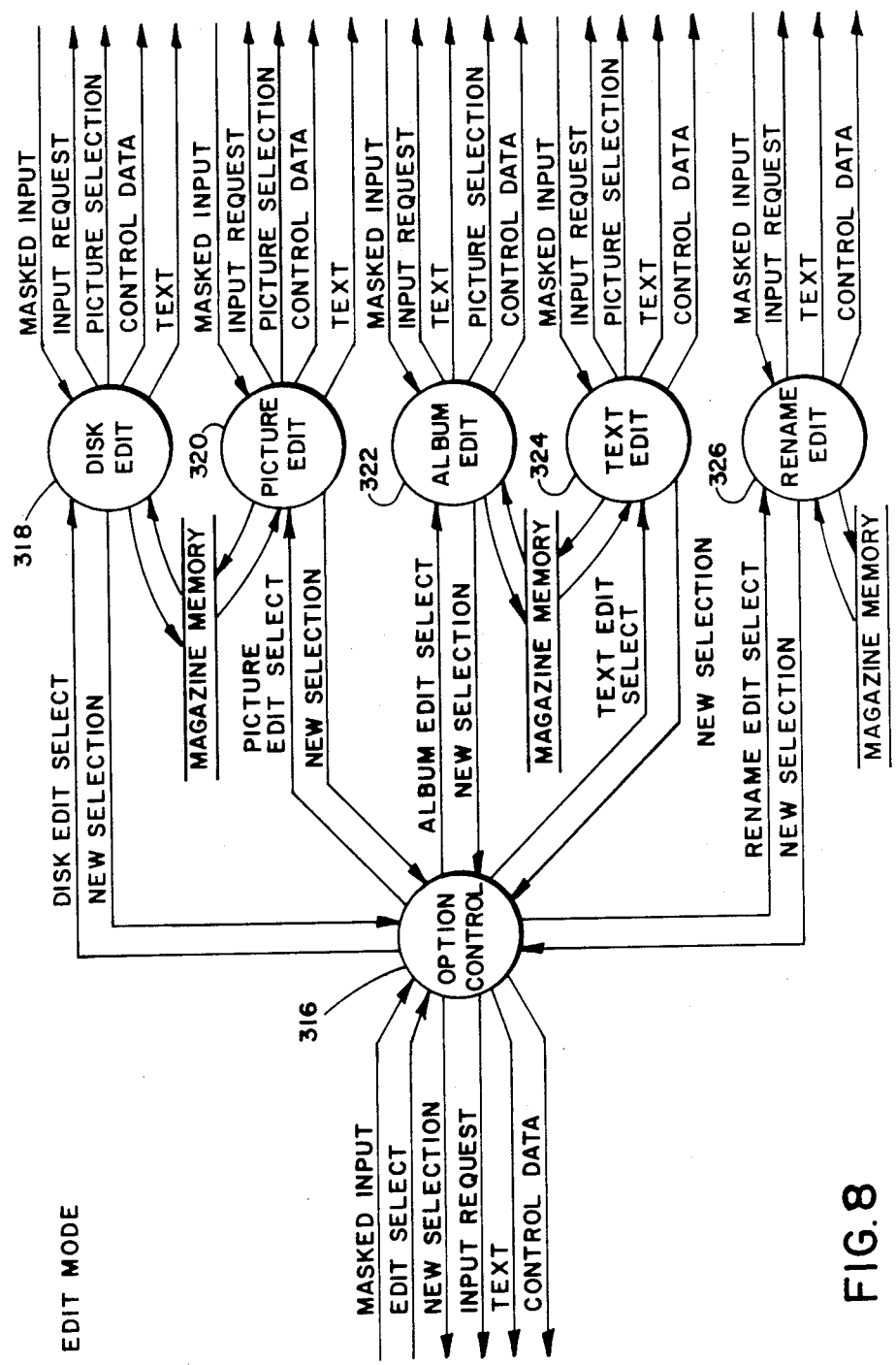
FIG. 8 is a data flow diagram of the edit mode of FIG. 6.

In the edit mode shown by FIG. 8, editing is initiated by EDIT SELECT and the "edit option screen (3)" is then generated by the edit option control 316. The editing process is partitioned into five levels as shown in FIG. 8. The various SELECT commands determine which edit level is selected at any given time, as follows. DISK EDIT SELECT selects a first-level disk edit process 318, PICTURE EDIT SELECT selects a second-level picture edit process 320, ALBUM EDIT SELECT selects a third-level album edit process 322, TEXT EDIT SELECT selects a fourth-level text edit process 324, and RENAME EDIT SELECT selects a fifth-level rename edit process 326. Each level is respectively described in detail by FIGS. 11-15.

Figure 11:
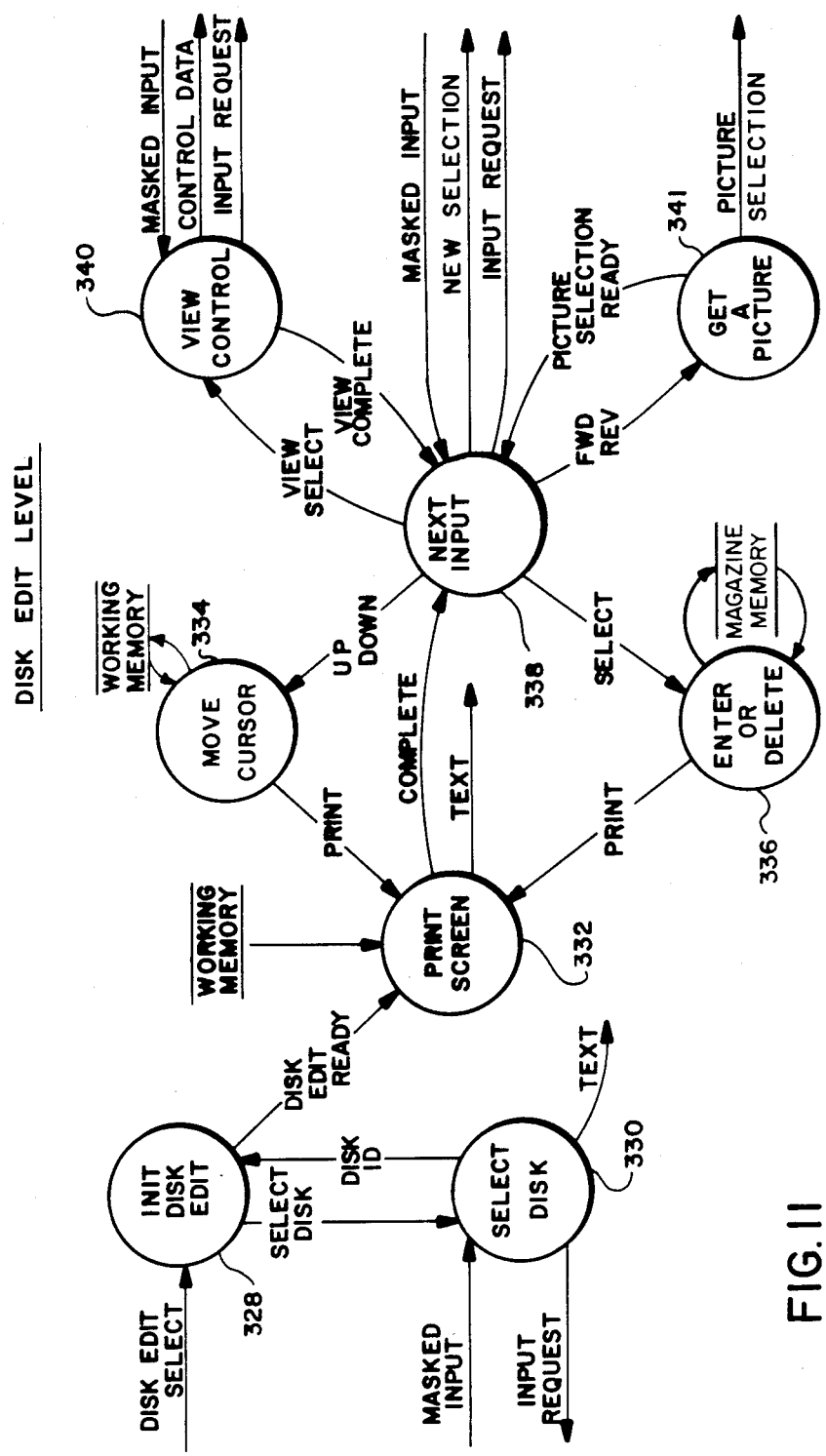
FIG. 11 is a data flow diagram of the disk edit level of FIG. 8.

For the disk edit level shown by FIG. 11, the DISK EDIT SELECT command turns control over to an initialization routine 328, which generates the "disk select screen" (4) in process 330. With DISK ID selected DISK EDIT READY is put out to a print screen process 332. The latter process prints the "edit screen" (5), which displays the prerecorded picture along with a message identifying the display attributes, that is, the list of albums, which are associated with this level. The cursor is moved by sending UP/DOWN to process 334 and, once the cursor is adjacent a selected album, the decision to categorize this picture in the selected album is recorded via SELECT to an enter/delete process 336. The decision is stored in the remote memory 20. A next input process 338 looks for an active controller button by sending an INPUT REQUEST to the mechanical operating system 286 and waiting for a MASKED INPUT to come back. With the corresponding input active, the cursor is moved, a decision to enter or delete a picture from an album is made, the entire picture may be viewed (process 340), or a new picture may be retrieved (by FWD/REV to a picture selection process 341).

Figure 12:
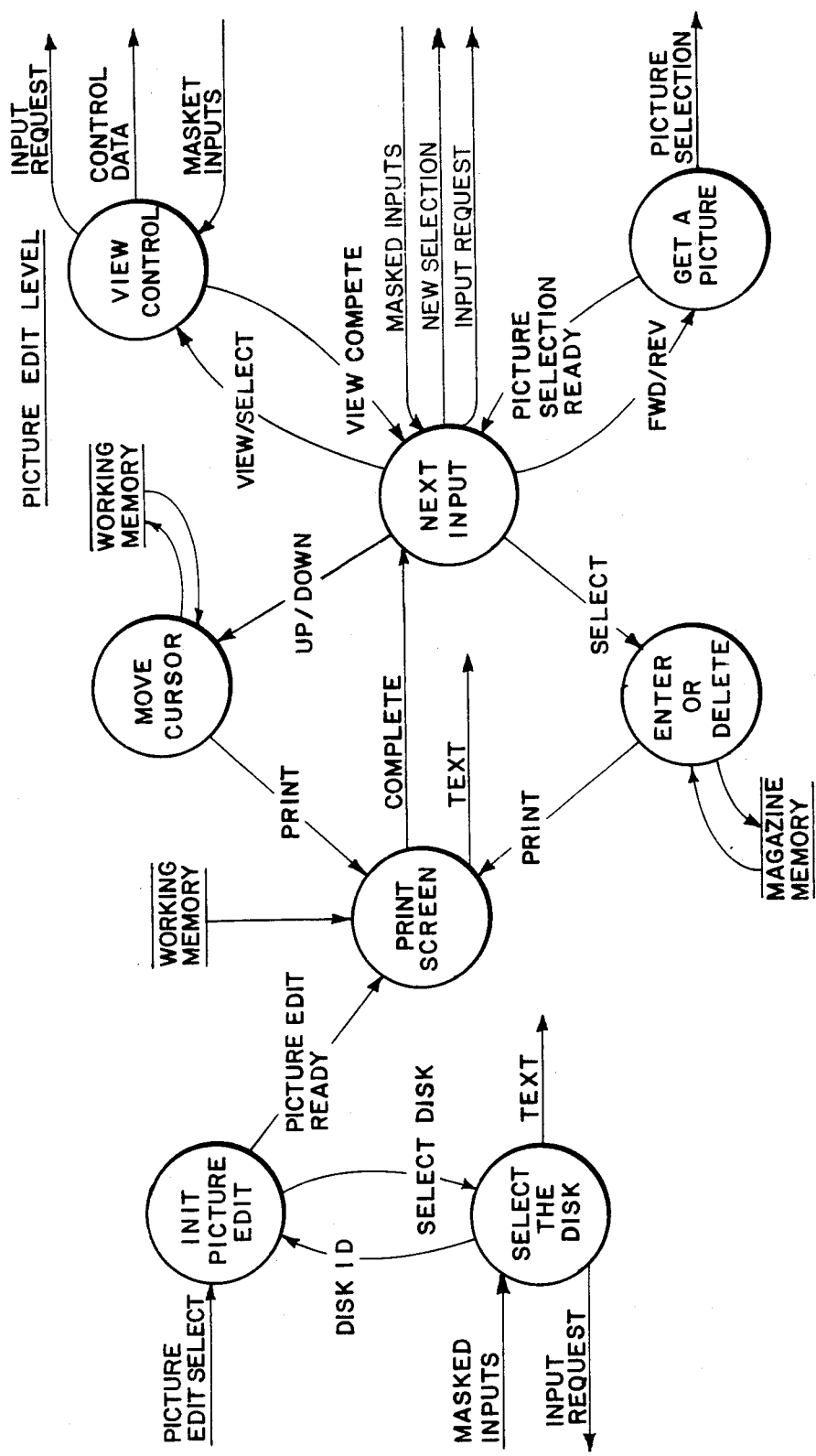
FIG. 12 is a data flow diagram of the picture edit level of FIG. 8.
Figure 13:
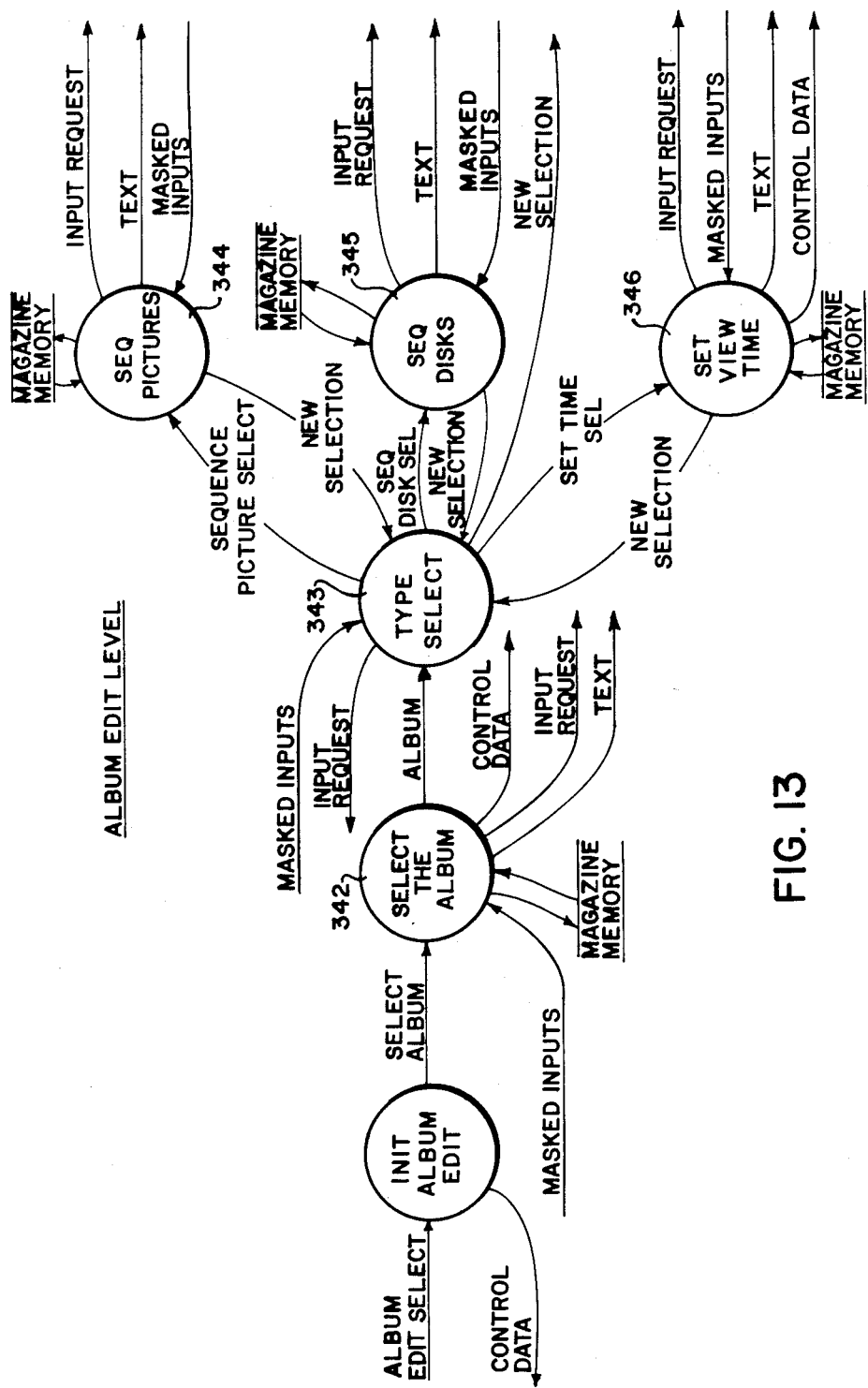
FIG. 13 is a data flow diagram of the album edit level of FIG. 8.
Figure 14:
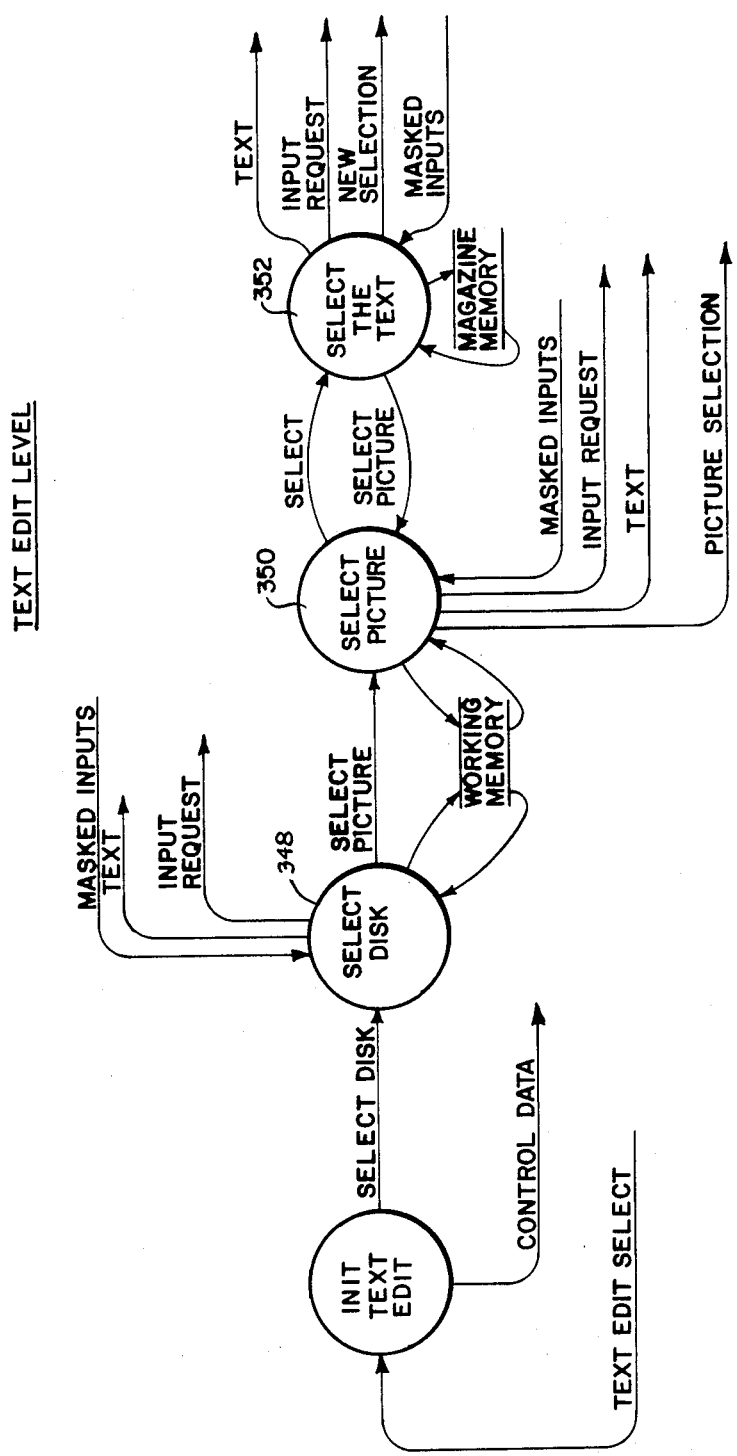
FIG. 14 is a data flow diagram of the text edit level of FIG. 8.
Figure 15:
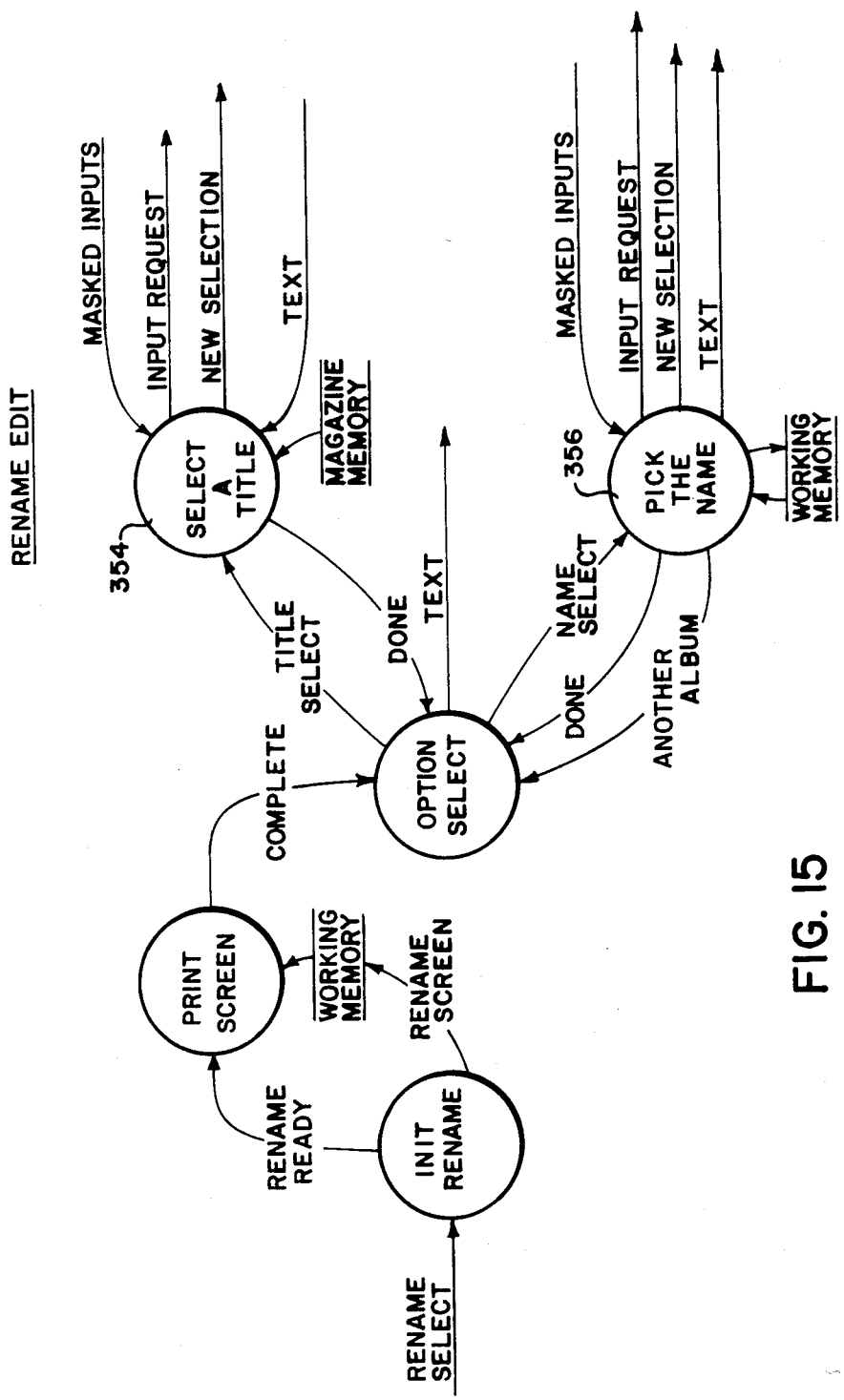
FIG. 15 is a data flow diagram of the rename edit level of FIG. 8.

The picture edit level, described by FIG. 12, has a data flow similar to the disk edit level shown by FIG. 11. The "disk select screen" (4) and the "edit screen" (5) are produced at similar points in the data flow and the decisions to enter or delete an album are accomplished similarly. The album edit level, shown by FIG. 13, starts with selection of an album in process 342 (which produces the "album select screen" (6)) and follows with process 343 which displays message (7). Three editing actions may be taken, that is, the sequencing of pictures (sequence picture process 344), the sequencing of disks (sequence disk process 345), and the setting of picture viewing time (set view time process 346). The text edit level shown by FIG. 14 involves the selection of a disk by reference to the "disk selection screen" (4), which is produced in process 348. A picture is then selected by manipulation of the controller buttons via process 350 and the text is specified as discussed in connection with screen (9) in a process 352. The rename edit level (FIG. 15) shows the two-step sequence of selecting the album (select title process 354) and then giving a name to the selected album (pick name process 356). The data flows and processes for cursor movement and the entering or deleting of display attributes relative to the album edit, text edit and rename edit levels are subsumed within the illustrated process steps. For example, the cursor movement and assignment of text values corresponding to screen (9) are included in the text selection process 352. The data flow is similar to that shown on the disk edit or picture edit levels.

Figure 9:
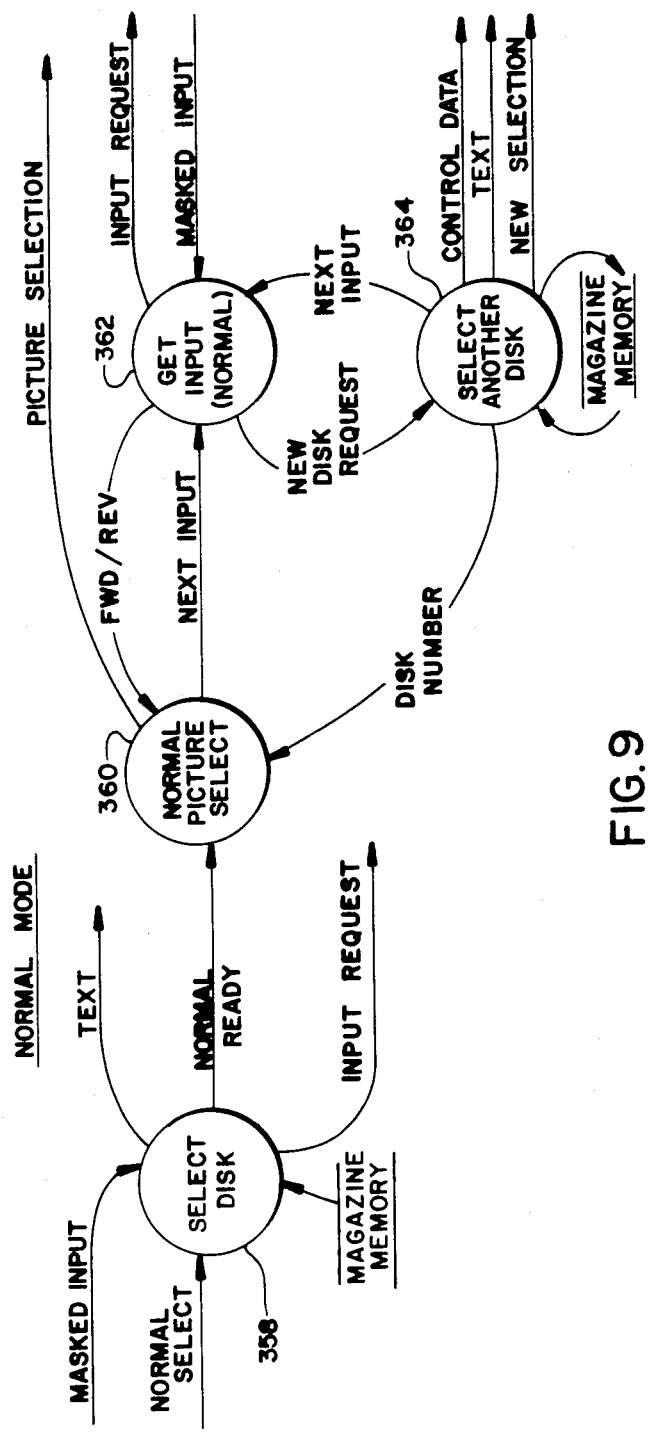
FIG. 9 is a data flow diagram of the normal mode of FIG. 6.
Figure 10:
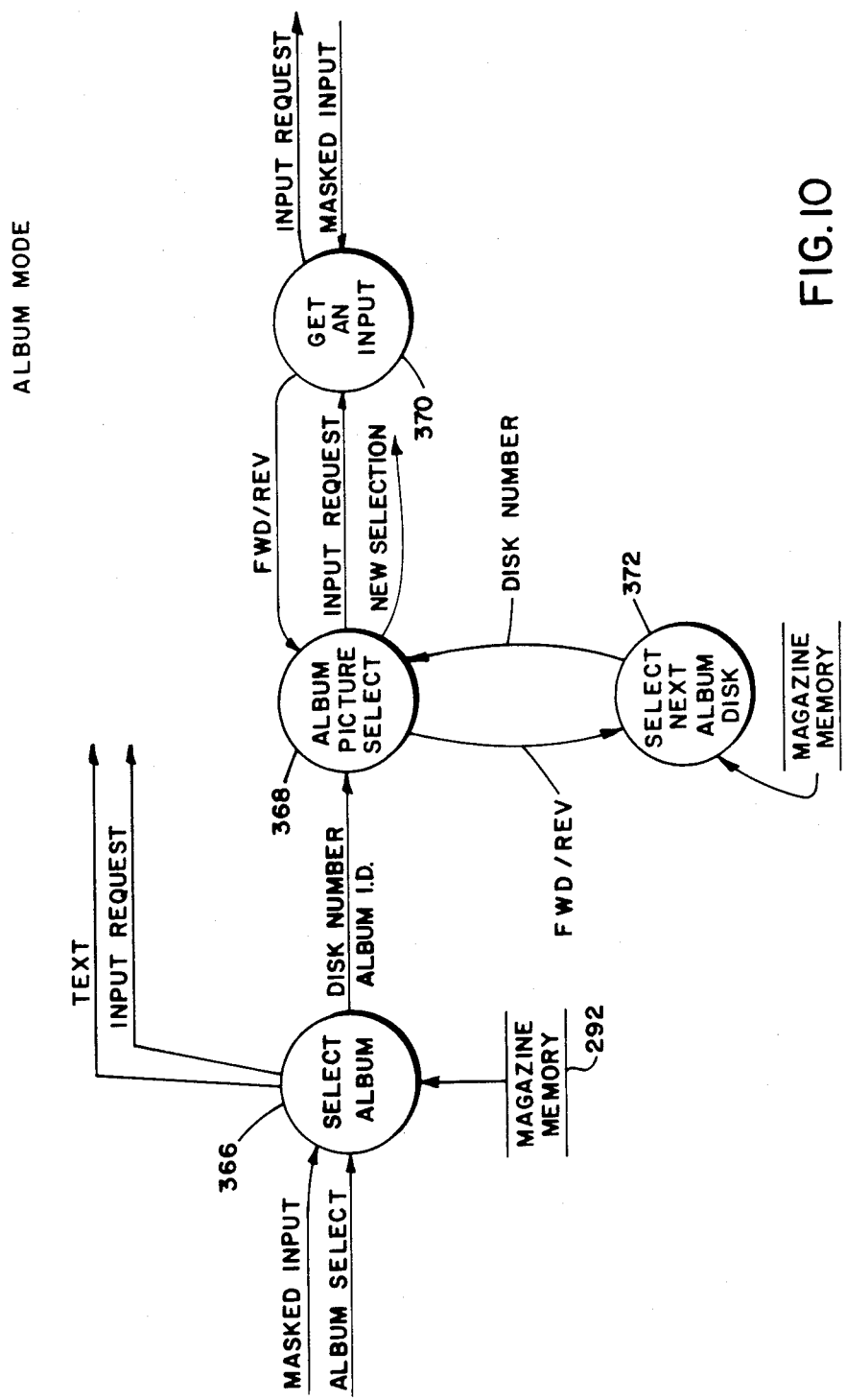
FIG. 10 is a data flow diagram of the album mode of FIG. 6.

The normal viewing mode, selected by the mode control process 294 of FIG. 6, is shown by the data flow diagram of FIG. 9. Once a disk is selected (process 358), NORMAL READY starts the picture selection process 360. NEXT INPUT to the input process 362 conditions the normal mode for the next MASKED INPUT. A number of outputs are possible, i.e., FWD/REV to increment or decrement to the next frame or NEW DISK REQUEST to look up a new disk (via select another disk process 364). When the viewer tires of the normal mode, NEW SELECTION takes him back to the menu screen (2). The album viewing mode, selected by the mode control process 294 of FIG. 6, is shown in further detail by the data flow diagram of FIG. 10. Once put in this state by ALBUM SELECT, the "album select screen" (6) is generated by the album selection process 366. The album picture assignments are retrieved from the magazine memory 292 and the show proceeds under control of an album picture selection process 368. Picture and disk advance is determined by either MASKED INPUT received via an input process 370 or FWD/REV commands to an auxiliary disk selection routine 372.

The data flow diagrams have not been described in all their detail since a combined reading of the specification material regarding the "screens" and the data dictionary provide the requisite information for fully interpreting the data flow diagrams. In addition, the lowest level process "bubbles" shown in the Figures may be further broken down according to the ordinary practice of one skilled in structured systems design.

It is also recognized that certain limitations in use of the video picture file as described herein are due to trade offs between cost and storage capacity, between user simplicity and complex capabilities and options, and the like. The result is relatively limited capacity in the remote memory 20, limited input selections in the seven button remote controller 24, and limitations in the amount of logical processing that can be used to select pictures. It is obvious that these limitations may be overcome, or at least alleviated, by providing more processing power and storage locations. One way of doing this is to provide a port on the video disk player for connecting with an external computer, say any of the many home or personal computers. Video picture file data could be kept entirely separate from the video disk player and magazine, such as on an ordinary floppy disk used by the computer. The controller 24 could be replaced by the keyboard associated with the computer. Certain edit options, like text edit, would become relatively simpler as to input (since a full alpha-numeric key pad could be used) and much more text could be stored. Pictures could be called up based on Boolean relationships, e.g., all pictures having this characteristic or that characteristic, and so on.

The invention has been described in detail with particular references to a presently preferred embodiment thereof, but it will be understood that variations and modifications can be effected within the spirit and scope of the invention.

TABLE I

| DATA DICTIONARY | |
|---|---|
| NAMES | DEFINITIONS |
| ALBUM | Provide selected album |
| ALBUM EDIT SELECT | Call to album edit level while in another state |
| ALBUM ID | Album number |
| ALBUM SELECT | Call to album mode while in another state |
| ANOTHER ALBUM | Continue the rename process |
| COMPLETE | Return to current state from print screen |
| CONTROL DATA | Control parameters for graphics generation |
| CONTROLLER INPUT | IR signal to player |
| DISK EDIT READY | Call to print screen while in disk edit state |
| DISK EDIT SELECT | Call to disk edit level while in another state |
| DISK ID | Disk number |
| DISK EDIT SCREEN | Initialize edit screen |
| DISK NUMBER | Index into the magazine for the disk |
| DONE | Rename process completed |
| EDIT SELECT | Call to edit mode while in another state |
| ENABLE | Start up file operating system |
| FWD/REV | Magazine (or frame) forward or magazine (or frame) reverse |
| GRAPHICS SIGNAL | Text and background color for TV display |
| INPUT REQUEST | Mask showing byte value for acceptable input selections |
| MAGAZINE DATA | Data from/to remote memory on the container |
| MAGAZINE MEMORY | EEROM on the disk container |
| MASKED INPUT | Bits set corresponding to user selection |
| NAME SELECT | Call to the name picking process |
| NEW DISK REQUEST | Call to disk selection |
| NEW SELECTION | Return to previous state |
| NEXT INPUT | Call to normal input |
| NORMAL READY | Call to normal mode |
| NORMAL SELECT | Call to normal mode while in another state |
| NTSC VIDEO AND GRAPHICS | NTSC video signal and graphics signal |
| PICTURE | Video picture signal |
| PICTURE EDIT READY | Call to print edit screen while in picture edit state |
| PICTURE EDIT SELECT | Call to picture edit level while in another state |
| PICTURE SELECTION | Frame number and disk number |
| PICTURE SELECTION READY | Return to current state from picture select state |
| PICTURE TRACK | Picture video track on the disk |
| PRINT | Call to print a screen |
| RENAME EDIT SELECT | Call to rename edit level while in another state |
| RENAME READY | Call to print screen in rename state |
| RENAME SCREEN | Initialize rename screen |
| SELECT | Enter cursor command |
| SELECT ALBUM | Call to album select screen |
| SELECT DISK | Call to disk select screen and return to current state |
| SELECT PICTURE | Call to picture select |
| SEQUENCE DISK SELECT | Call to sequence disks |
| SEQUENCE PICTURE SELECT | Call to sequence picture |
| SET TIME SELECT | Call to set time |
| SET UP READY | Call to print set-up screen |
| SET UP SCREEN | Initialize set-up screen |
| SET UP SELECT | Call to set-up mode while in another state |
| TEXT | Characters for display |
| TEXT EDIT SELECT | Call to text edit level while in another state |
| TITLE SELECT | Call to title selection process |
| UP/DOWN | Move cursor up or down |
| USER SELECTIONS | Seven button selections on remote controller |
| UNLOAD | Magazine is moved to unload position |
| VIDEO SIGNAL | Video signal from picture track |
| VIEW COMPLETE | Return to edit state showing cropped picture |
| VIEW SELECT | Call to view all of picture |
| WORKING MEMORY | RAM in player circuit |

What is claimed is:

1. An editing method divided into separate levels for organizing a predetermined sequence of prerecorded video pictures into an electronic picture file having a modified display sequence, the video pictures being prerecorded on a plurality of video disks arranged in a predetermined order in a removable magazine disposed in a video player, said picture organization being (1) distinct from the pictures in a memory appended to the magazine, and (2) dependent upon different types of picture-related data that identify such characteristics as subject-matter category, picture display order and picture description, said editing method comprising the steps of:

displaying a plurality of mutually independent editing levels, each level devoted to specifying at least one particular type of picture-related data;
selecting a first editing level;
transferring a disk from the magazine into the player;
displaying a prerecorded picture from the disk;
generating picture-related data defining the corresponding characteristic for the displayed picture;
storing said picture-related data in the memory appended to the magazine; and
replacing the disk in the magazine according to the predetermined order whereby the picture on the disk is prepared for display according to the organization dictated by said picture-related data stored in the memory.

2. An editing method as claimed in claim 1 in which the prerecorded picture is displayed in combination with picture-related data derived at least in part from said memory appended to the magazine.

3. An editing method as claimed in claim 2 in which said picture-related data derived from the memory includes picture-related data specified during prior editing at the same or a different editing level.

4. An editing method as claimed in claim 1 further comprising:

selecting a further editing level;
transferring said disk from the magazine into the player;
displaying said prerecorded picture from the disk;
generating further picture-related data defining a further corresponding characteristic for the displayed picture; and
storing said further picture-related data in the memory in combination with pre-existing picture-related data from said first editing level.

5. An editing method as claimed in claim 4 in which said prerecorded picture is displayed responsive to said first level of picture-related data derived from said memory.

* * * * *